US012686981B2

(12) United States Patent
Schaedler

(10) Patent No.: US 12,686,981 B2
(45) Date of Patent: Jul. 21, 2026

(54) HIGH EFFICIENCY AND HIGH PERFORMANCE MULTI-STAGE SNOW THROWER

(71) Applicant: MTD PRODUCTS INC, Valley City, OH (US)

(72) Inventor: Axel Schaedler, Olmsted Falls, OH (US)

(73) Assignee: MTD Products Inc, Valley City, OH (US)

( * ) Notice: Subject to any disclaimer, the term of this patent is extended or adjusted under 35 U.S.C. 154(b) by 380 days.

(21) Appl. No.: 18/221,177

(22) Filed: Jul. 12, 2023

(65) Prior Publication Data

US 2024/0018733 A1 Jan. 18, 2024

Related U.S. Application Data

(60) Provisional application No. 63/388,436, filed on Jul. 12, 2022.

(51) Int. Cl.
*E01H 5/09* (2006.01)
*H02P 29/00* (2016.01)

(52) U.S. Cl.
CPC ............. *E01H 5/098* (2013.01); *H02P 29/00* (2013.01)

(58) Field of Classification Search
CPC ......... E01H 5/045; E01H 5/096; E01H 5/098; H02P 29/00
See application file for complete search history.

(56) References Cited

U.S. PATENT DOCUMENTS

| | | | |
|---|---|---|---|
| 6,944,979 B2 * | 9/2005 | Hanafusa | E01H 5/04 |
| | | | 37/260 |
| 2011/0094129 A1 * | 4/2011 | Rowe | E01H 5/045 |
| | | | 37/246 |
| 2014/0202047 A1 * | 7/2014 | Kawakami | E01H 5/098 |
| | | | 37/257 |
| 2017/0101756 A1 * | 4/2017 | Zhang | B60K 1/00 |
| 2018/0274188 A1 * | 9/2018 | Schaedler | E01H 5/045 |
| 2021/0040701 A1 * | 2/2021 | Yamaoka | H02K 7/116 |
| 2021/0277617 A1 * | 9/2021 | Yamaoka | H02K 11/0094 |

(Continued)

FOREIGN PATENT DOCUMENTS

| | | | | |
|---|---|---|---|---|
| CN | 111411605 A | * | 7/2020 | E01H 5/098 |
| WO | 2016/123211 A1 | | 8/2016 | |

OTHER PUBLICATIONS

Extended European Search Report for European Patent Application No. 23184962.1 dated Nov. 29, 2023 7 pages long.

*Primary Examiner* — Matthew R Buck
(74) *Attorney, Agent, or Firm* — Wegman Hessler

(57) ABSTRACT

An electric powered snow thrower having high efficiency and high performance is disclosed. The electric powered snow thrower can incorporate an impeller that achieves high throw distances even at significantly lower power than conventional devices. Additionally, aspects of the electric powered snow thrower enable adjustment between different performance and power levels to adjust snow throw distance to optimize performance with power consumption and battery longevity. In some disclosed aspects, the performance level is coupled with a chute deflector height to simplify a selection between low power consumption and short throwing distance and high power consumption and long throwing distance, and all ranges there between.

31 Claims, 20 Drawing Sheets

EXAMPLE SNOW THROWER
100

HANDLES
110

CONTROL PANEL
120

CHUTE DEFLECTOR
145

CHUTE
140

POWER SUPPLY
130

116

152

160
AUGER

HOUSING
150

105

(56)          References Cited

U.S. PATENT DOCUMENTS

| | | | |
|---|---|---|---|
| 2022/0074156 A1* | 3/2022 | Li | E01H 5/098 |
| 2022/0098811 A1* | 3/2022 | Bonney | E01H 5/098 |
| 2022/0134531 A1* | 5/2022 | Li | H02K 5/24 |
| | | | 310/58 |

* cited by examiner

EXAMPLE SNOW THROWER
100

HANDLES
110

CONTROL PANEL
120

CHUTE DEFLECTOR
145

POWER SUPPLY
130

116

CHUTE
140

152

105

160
AUGER

HOUSING
150

EXAMPLE ELECTRIC AND BATTERY POWERED SNOW THROWER 200

CHUTE DEFLECTOR 145

CHUTE 140

CHUTE ROTATION 240

RECHARGEABLE POWER SUPPLY 205

205B

205A

POWER SUPPLY HOUSING 206

ELECTRIC MOTOR 210

IMPELLER HOUSING 220

EXAMPLE ELECTRIC SNOW THROWER
300

EXAMPLE ELECTRIC SNOW THROWER
400

CHUTE DEFLECTOR
(FULLY UP)
445

DEFLECTOR CABLE
CONNECTION
420

CHUTE
440

MOTOR CONTROL ->
CHUTE DEFLECTOR
COUPLING
425

410

414

412

IMPELLER MOTOR CONTROL
(HIGH POWER)

EXAMPLE SNOW THROW RANGE AT HIGH
POWER (NON-BOOST)
400A

(THROW RANGE
~20-22' )
410A

OPERATING RANGE OF 1700 – 2300 RPM; 1kW -> 1.5kW
420A

EXAMPLE SNOW THROW RANGE AT HIGHEST POWER – BOOST MODE
400B

(THROW RANGE
~45' )
410B

OPERATING RANGE OF 3200 – 3800 RPM; 2.6kW -> 3.0kW
420B

EXAMPLE ELECTRIC SNOW THROWER
500

CHUTE DEFLECTOR
(FULLY DOWN)
545

DEFLECTOR CABLE
CONNECTION
420

MOTOR CONTROL ->
CHUTE DEFLECTOR
COUPLING
425

CHUTE
440

IMPELLER MOTOR
CONTROL
(LOW POWER)
512

410

414

R1
R2

EXAMPLE SNOW THROW RANGE AT LOW POWER
500A

OPERATING RANGE OF 1000 – 1400 RPM; 0.5kW -> 0.7kW
510A

EXAMPLE ELECTRIC SNOW THROWER
600

CHUTE ROTATION DRIVE
635

MOTOR CONTROL -> CHUTE DEFLECTOR COUPLING
425

CHUTE DEFLECTOR (MID POSITION)
645

410

IMPELLER MOTOR CONTROL (MID-POWER)
612

414

EXAMPLE CONTROL PANEL WIRING
700

CONTROL LEVER
PIVOT POINT
715

425

720

CONTROL LEVER CABLE
710

IMPELLER MOTOR WIRE

EXAMPLE ELECTRIC AND BATTERY POWERED SNOW THROWER
800A

EXAMPLE ELECTRIC AND BATTERY POWERED SNOW THROWER
900

INTERNAL
AUGER MOTOR
910

HIGH EFFICIENCY IMPELLER
950

INTERNAL
AUGER DRIVE
920

AUGER
930

940

DRIVE EXCHANGE

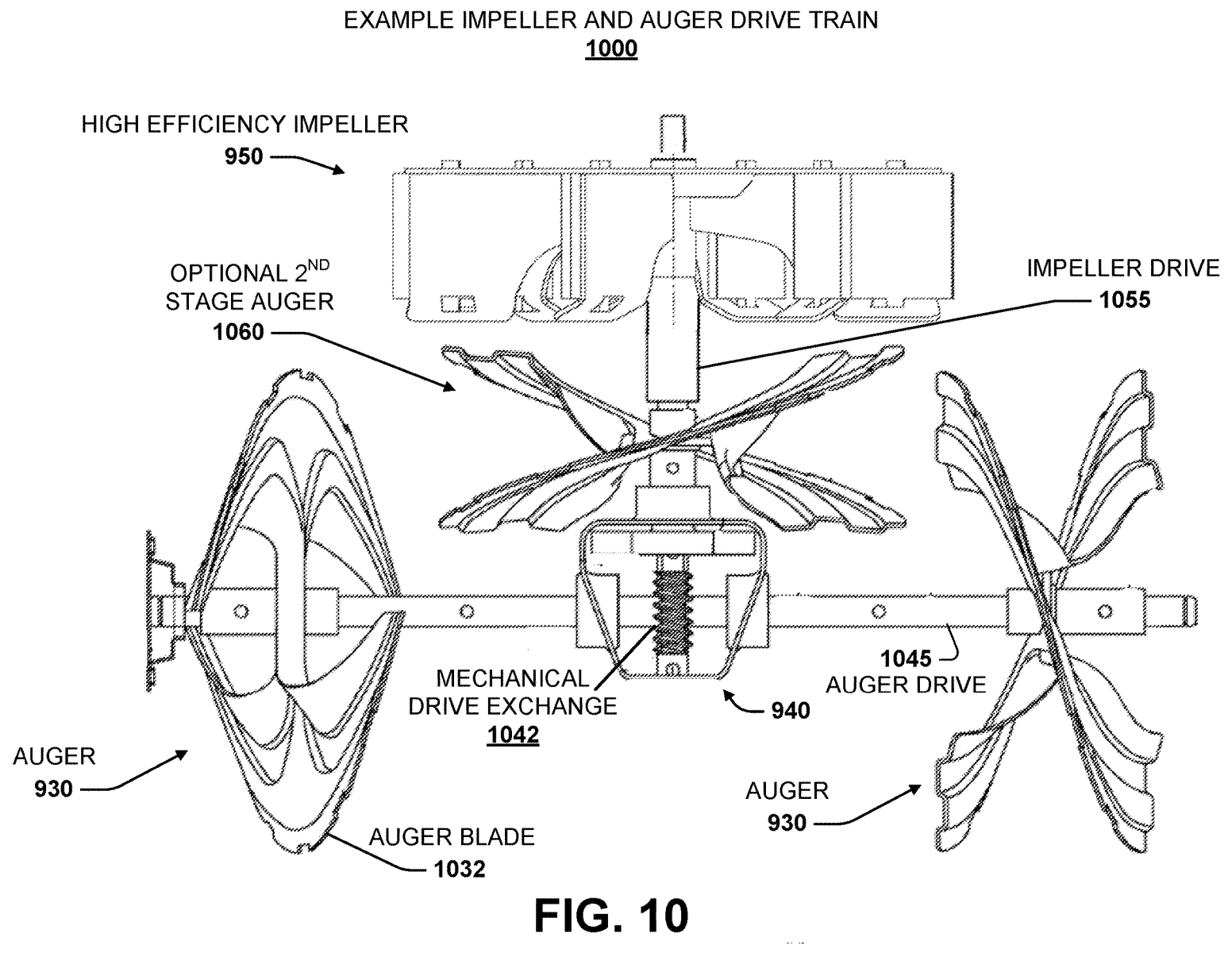

EXAMPLE IMPELLER AND AUGER DRIVE TRAIN 1000

HIGH EFFICIENCY IMPELLER 950

OPTIONAL 2ND STAGE AUGER 1060

IMPELLER DRIVE 1055

AUGER DRIVE 1045

940

MECHANICAL DRIVE EXCHANGE 1042

AUGER BLADE 1032

AUGER 930

AUGER 930

FIG. 10

EXAMPLE HIGH EFFICIENCY IMPELLER 1100

FORWARD TILT 1126

EXAMPLE IMPELLER – AUGER DRIVE EXCHANGE 1400

IMPELLER DRIVE SHAFT 1410

FROM IMPELLER DRIVE (e.g., IMPELLER PULLEY 340) 1414

IMPELLER DRIVE GEAR 1422

AUGER DRIVE SHAFT 1430

DRIVE EXCHANGE HOUSING 1420

AUGER DRIVE GEAR 1424

IMPELLER DRIVE GEAR
1422

EXAMPLE IMPELLER – AUGER DRIVE EXCHANGE
1400

AUGER DRIVE SHAFT
1430

IMPELLER DRIVE
SHAFT
1410

DRIVE EXCHANGE
HOUSING
1420

1424

AUGER DRIVE GEAR

EXAMPLE CONTROL UNIT

HIGH EFFICIENCY AND HIGH PERFORMANCE MULTI-STAGE SNOW THROWER

CROSS-REFERENCE TO RELATED APPLICATION

The present application for patent claims the benefit of priority from U.S. Provisional Patent Application Ser. No. 63/388,436 entitled HIGH EFFICIENCY AND HIGH PERFORMANCE MULTI-STAGE SNOW THROWER and filed Jul. 12, 2022, which is hereby incorporated by reference herein in its entirety and for all purposes.

INCORPORATION BY REFERENCE

U.S. Pat. No. 10,087,592 issued Oct. 2, 2018 is hereby incorporated by reference herein in its entirety and for all purposes.

FIELD OF DISCLOSURE

This application relates generally to snow throwing power equipment, and more specifically to a highly efficient snow throwing power equipment apparatus that can exceed performance of many conventional machines.

BACKGROUND

Snow removal machines typically include housings with a forward opening through which material enters the machine. At least one rotatable member (auger) is positioned and rotatably secured within the housing for engaging and advancing the snow toward a center and rear of the housing. From a general perspective, snow blower technology designs provide flighted augers that move snow axially toward an impeller that is driven integrally with (single stage) or independently from (two-stage, three-stage, etc.) the augers. Impellers are usually devices such as discs and blades that are shaped and configured such that when rotated they receive materials (snow) and then centrifugally discharge the materials through openings in the housings and then into chutes that control and direct the materials.

Existing snow throwers can effectively clear light amounts of snow. However, in situations involving larger quantities of snow, heavy snow, or wet snow, many snow throwers become bogged down or even stall as they struggle to move the snow or slush past the impeller and out of the snow thrower. This degrades performance and renders the snow thrower less effective at accomplishing efficient removal of snow from a surface.

SUMMARY

The following presents a simplified summary in order to provide a basic understanding of some example aspects of the disclosure. This summary is not an extensive overview. Moreover, this summary is not intended to identify critical elements of the disclosure nor delineate the scope of the disclosure. The sole purpose of the summary is to present some concepts in simplified form as a prelude to the more detailed description that is presented later.

In various embodiments, the subject disclosure provides a high efficiency snow thrower apparatus. The snow thrower apparatus can be an electric powered device, though is not limited to this particular design and can be powered by combustion engine, hydraulic motor, pneumatic motor, or the like, or suitable combinations of the foregoing, in various aspects of the present disclosure. Further, the snow thrower apparatus can incorporate a high efficiency impeller design that allows for significantly reduced power consumption while achieving excellent snow throwing distances compared with other snow thrower devices. In additional aspects, a performance selection input is provided enabling an operator to select between a range of power consumption levels, a range of snow throw distances, a range of impeller operating speeds, or a combination of the foregoing. In still further aspects, a boost mode actuator is provided to facilitate very high performance when engaged by the operator.

According to one aspect, a first example snow thrower is disclosed. The first example snow thrower can comprise a drive element configured to move the snow thrower on a surface, an auger housing and an auger positioned within the auger housing for moving material within the auger housing toward an output of the auger housing and an impeller housing coupled to the auger housing and having an intake through which the material is received at the impeller housing from the output of the auger housing. Further, the first example snow thrower can comprise an impeller configured to receive the material at the intake of the impeller housing and expel the material from the impeller housing by way of a chute coupled to the impeller housing. The impeller can comprise a blade arm extending from a first end near a center of rotation of the impeller to a second end near a perimeter of the impeller and having a blade arm length and a wiper positioned adjacent a portion of the blade arm that is movable a predefined distance beyond the blade arm length of the blade arm. Still further, the first example snow thrower can comprise a power system comprising an electric motor that generates mechanical power as an output and receives electrical power as an input, and a distribution system configured to transfer a portion of the mechanical power to rotate the impeller within the impeller housing to facilitate expelling the material from the impeller housing by way of the chute.

According to another aspect, a second example snow thrower is disclosed. The second example snow thrower can comprise a frame, a drive element secured to the frame and supporting the frame above a surface, wherein the drive element is configured to move the snow thrower apparatus with respect to the surface, an impeller housing secured to the frame and an auger housing secured to the frame. In addition to the foregoing, the second example snow thrower can further comprise an impeller rotatably disposed within the impeller housing, an auger rotatably disposed within the auger housing, and an electric motor secured to the frame. Moreover, the second example snow thrower can comprise a power source electrically coupled to the electric motor to provide electric power to the electric motor and a motor drive powered by and at an output of the electric motor and mechanically coupled to the impeller for rotating the impeller within the impeller housing. Further, the second example snow thrower can comprise an impeller controller configured to vary an impeller rotation speed of the impeller within a range defined by a low impeller speed at one end of the range and a high impeller speed at a second end of the range. Still further, the second example snow thrower can comprise an impeller drive control input device configured to cause the impeller controller to vary the impeller speed between the range defined by the low impeller speed and the high impeller speed, wherein when positioned in the low impeller speed the motor drive has a mechanical rotation per minute (rpm) in a range from about 1000 rpm to about 1400 rpm and when positioned in the high impeller speed the motor drive has a second mechanical rpm in a second range from about 1700 rpm to about 2300 rpm.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

BRIEF DESCRIPTION OF THE DRAWINGS

The foregoing and other aspects of the present disclosure will become apparent to those skilled in the art to which the present disclosure relates upon reading the following description with reference to the accompanying drawings, in which:

FIG. 10 illustrates an example multi-stage auger drive and impeller drive for a snow thrower apparatus, in further aspects disclosed herein.

4

Figure 13:
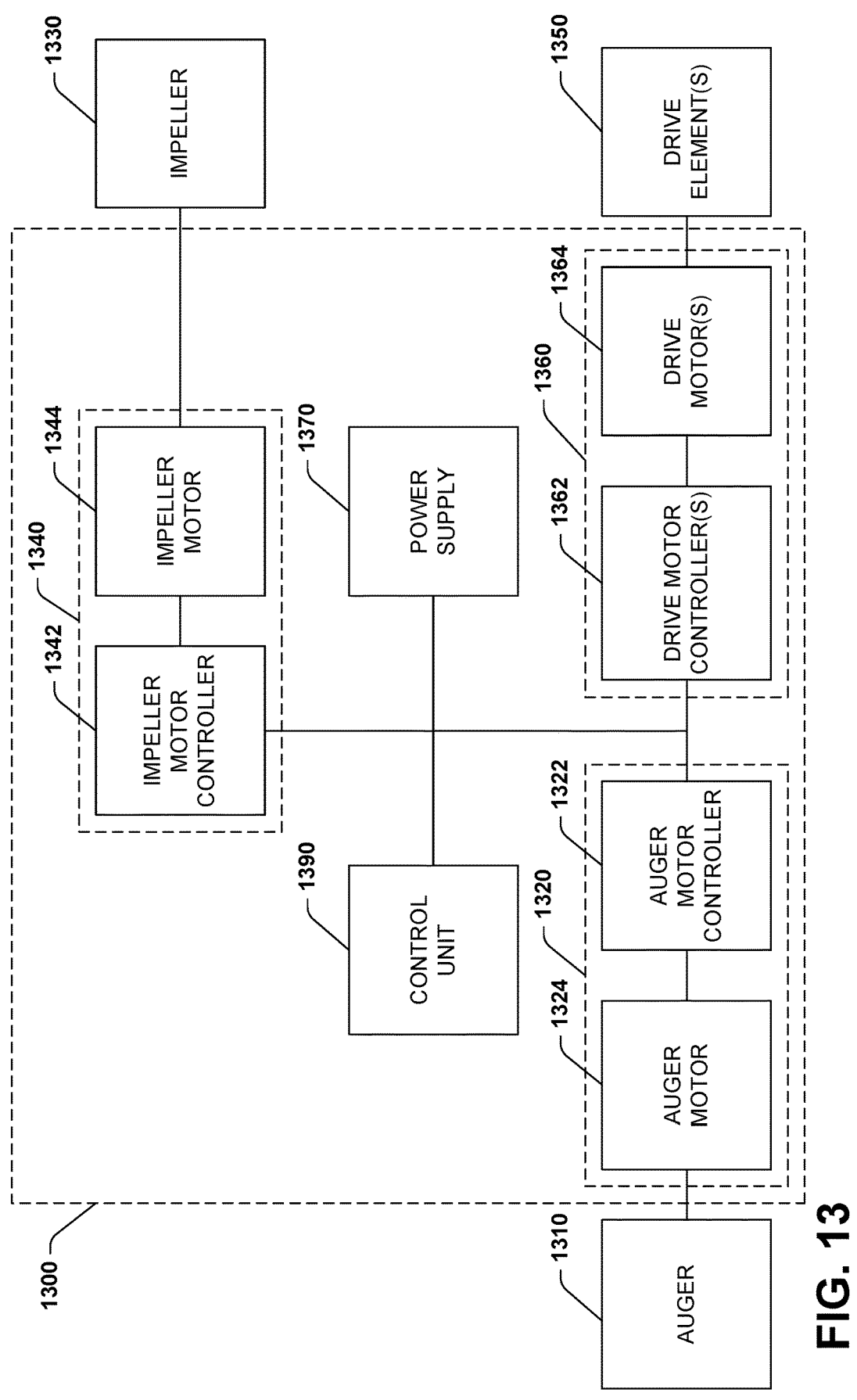

FIG. 13 depicts a block diagram of an example controller for impeller, auger or drive control of a snow thrower apparatus, in further aspects.

Figure 14:
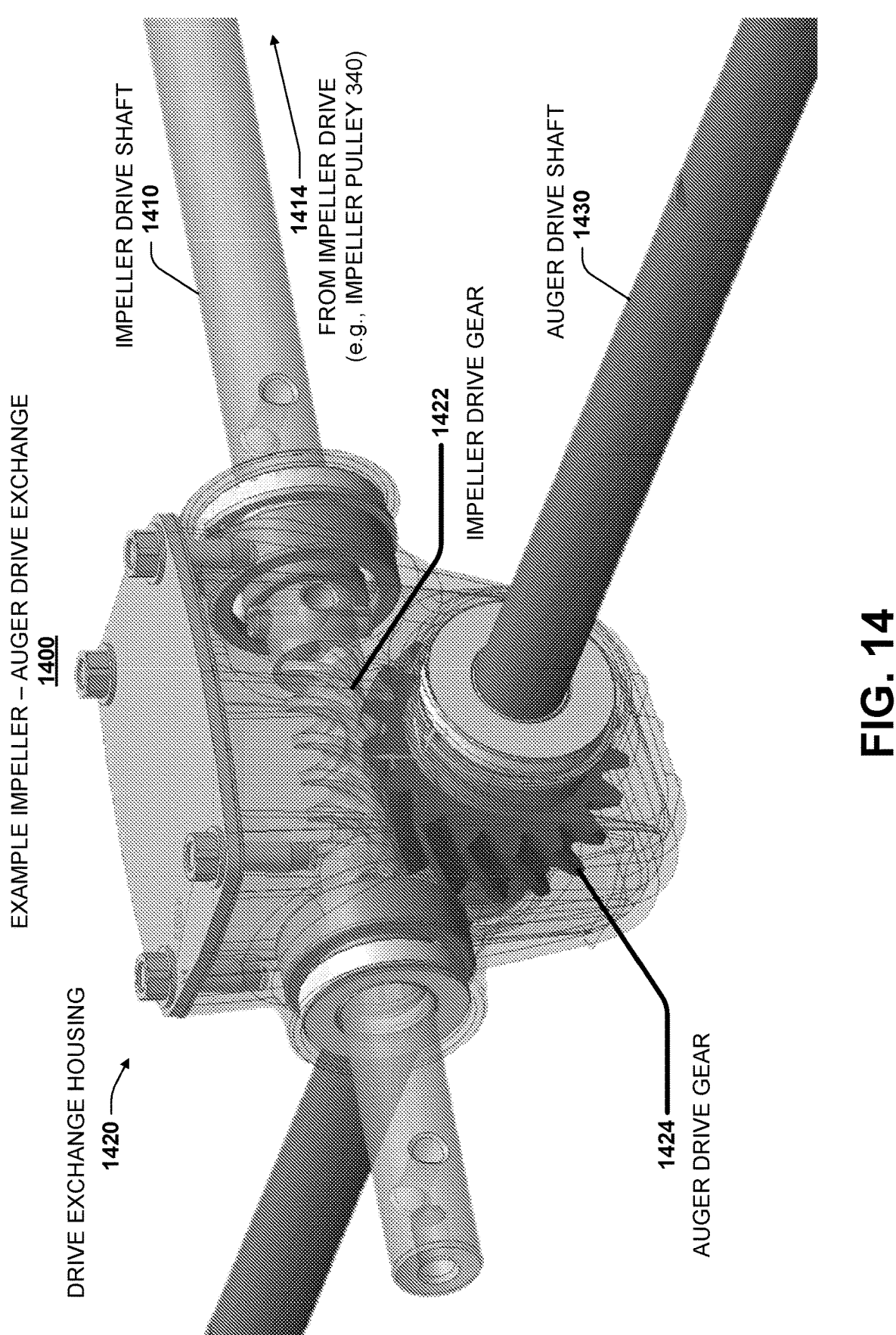

FIG. 14 illustrates an example impeller—auger drive exchange for a single impeller/auger motor in alternative or additional aspects disclosed herein.

Figure 14A:
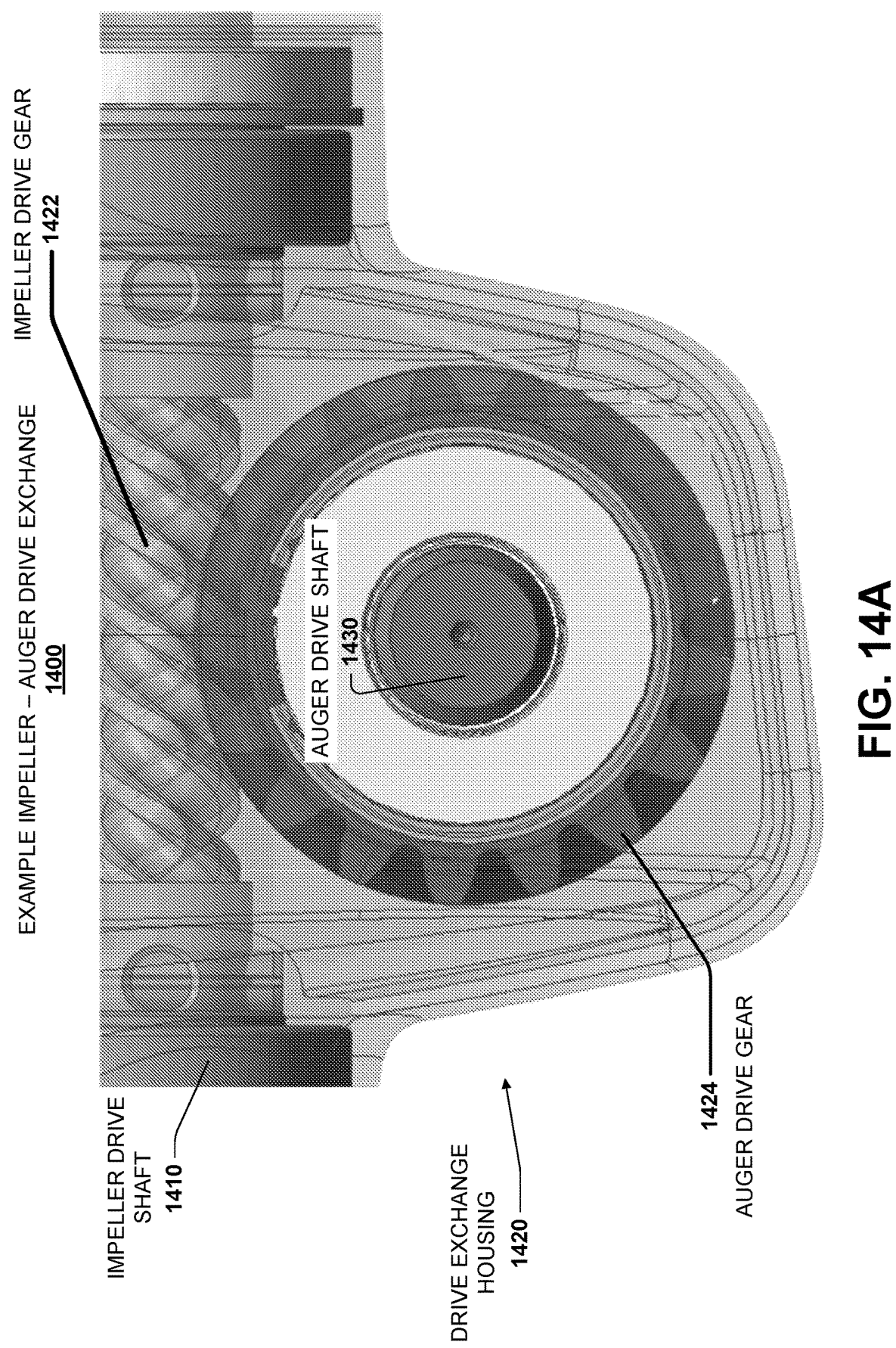

FIG. 14A depicts a side view of the example impeller—auger drive exchange of FIG. 14.

Figure 15:
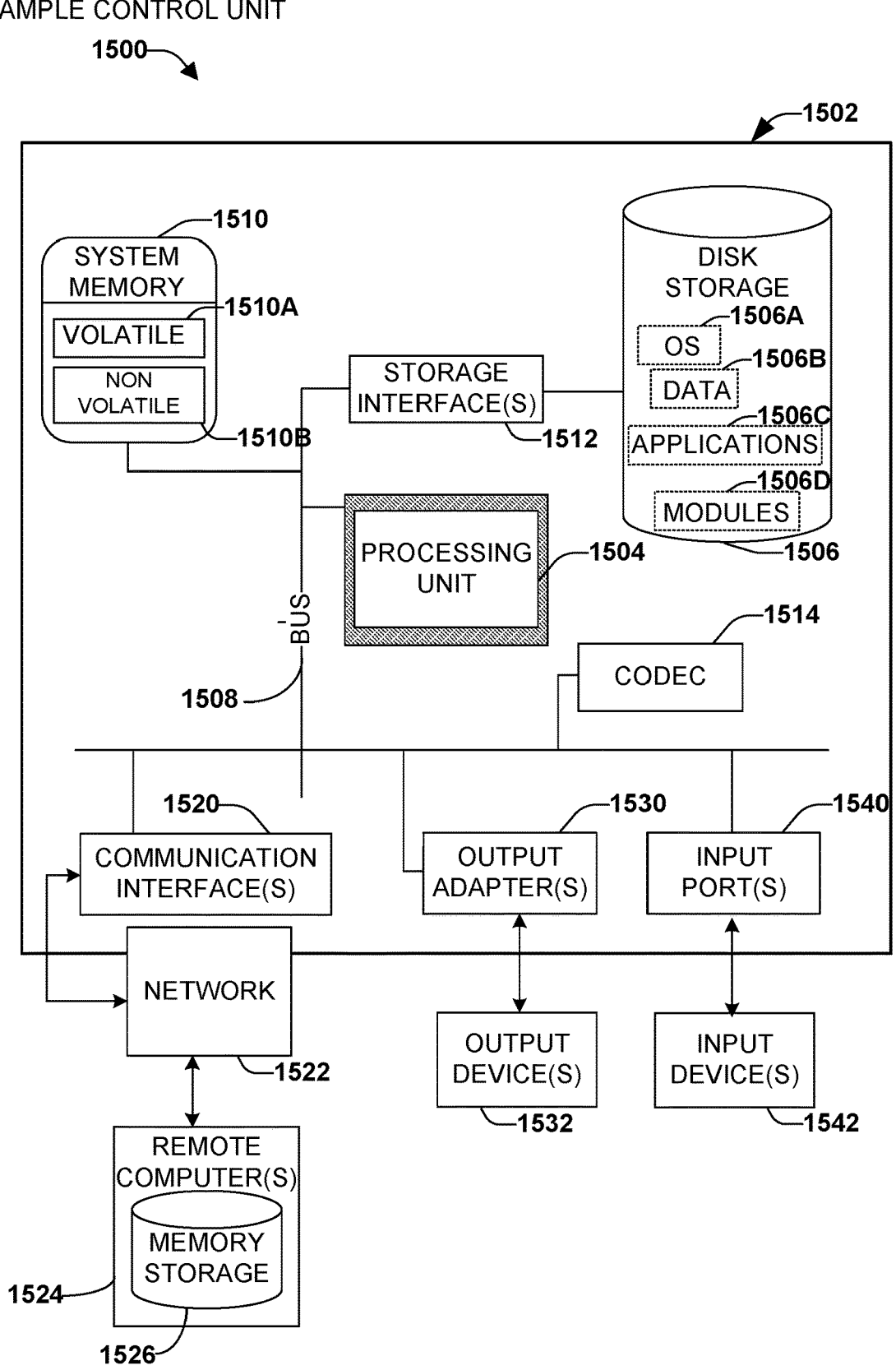

FIG. 15 illustrates a block diagram of an example control unit operable in conjunction with one or more aspects of the present disclosure.

It should be noted that the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments, except where clear from context that same reference numbers refer to disparate features. Accordingly, the drawings and description are to be regarded as illustrative in nature and not as restrictive.

While embodiments of the disclosure pertaining to providing user feedback and enhanced drivability in drive-by-wire systems for power equipment machines are described herein, it should be understood that the disclosed machines, electronic and computing devices and methods are not so limited and modifications may be made without departing from the scope of the present disclosure. The scope of the systems, methods, and electronic and computing devices for providing user feedback and enhanced drivability in drive-by-wire systems are defined by the appended claims, and all devices, processes, and methods that come within the meaning of the claims, either literally or by equivalence, are intended to be embraced therein.

DETAILED DESCRIPTION

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation on the present disclosure. Still further, in the drawings, the same reference numerals are employed for designating the same elements.

Figure 1:
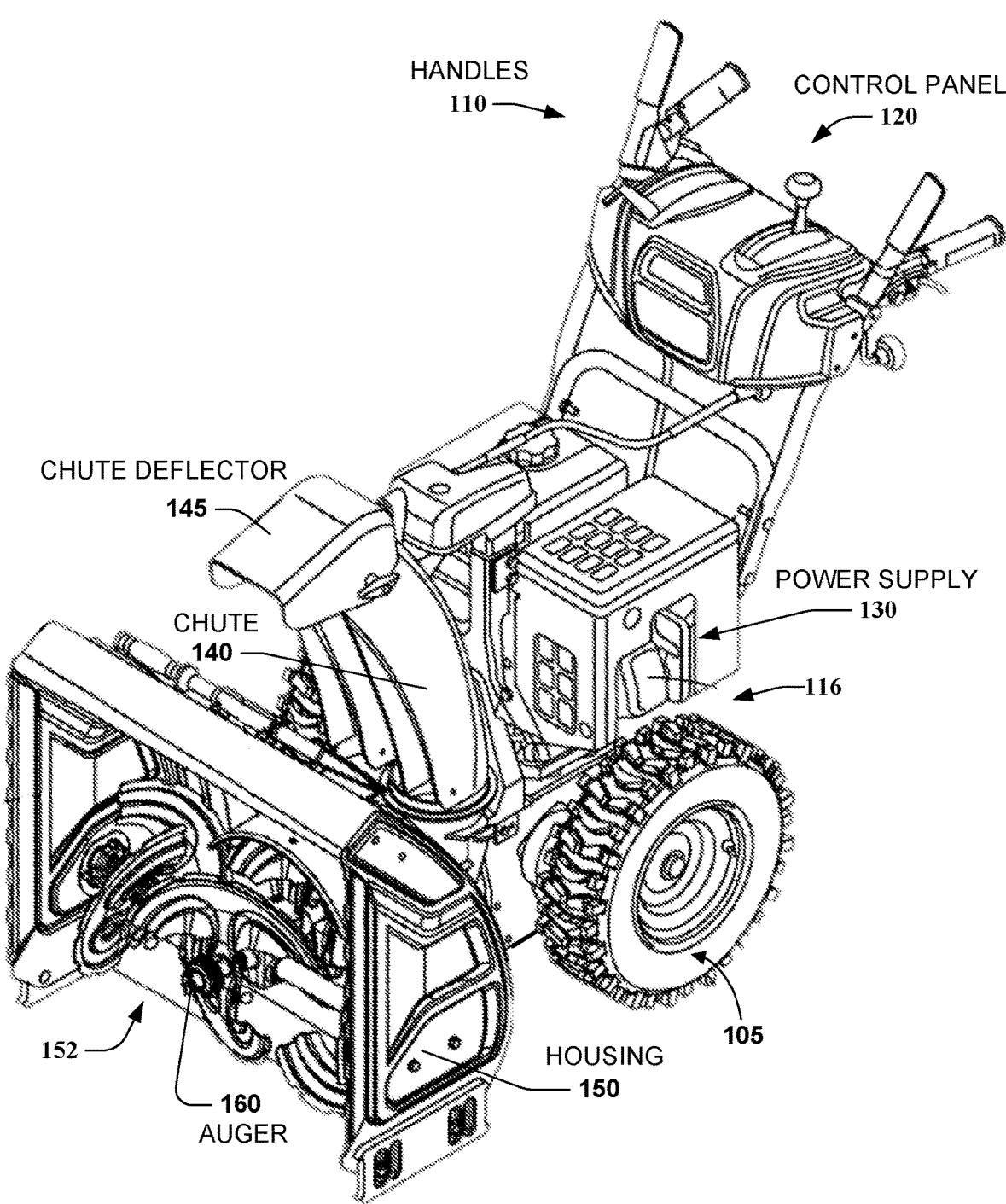
FIG. 1 illustrates a diagram of an example snow thrower apparatus, according to various aspects discussed herein.

Referring to FIG. 1, an embodiment of the present disclosure is illustrated as an example snow thrower apparatus 100. Snow thrower apparatus 100 includes a power supply 130 configured to provide power, whether directly or indirectly, to one or more components of snow thrower apparatus 100 to accomplish functions of snow thrower apparatus 100. For instance, power supply 130 can be configured to provide mechanical power to mechanically driven implements, electrical power to electrically driven implements or to electronic devices utilizing the electrical power for data processing, data storage, data display, operator interface functions, or the like, or a suitable combination of the foregoing. As one example, power supply 130 can provide power to drive one or more implement devices—such as auger 160—of snow thrower apparatus 100 to remove snow (or other material) from a surface on which snow thrower apparatus 100 operates. In another example, power supply 130 can drive an impeller of snow thrower apparatus that ejects snow (or other material) from an interior of snow thrower apparatus 100 (e.g., see FIGS. 9-11, infra) to an exterior thereof. The impeller is another example of an implement device of snow thrower apparatus 100. In yet another example, power supply 130 can drive movable members 105 (depicted as wheels, but can also include tracks, chains, or similar device) for moving snow thrower apparatus 100 on the surface. Movable members 105 can also be considered among the implement devices of snow thrower apparatus 100, in some disclosed embodiments. In FIG. 1, power supply 130 is shown as an internal combustion engine, but can alternatively be embodied by an electric motor corded to receive electrical power—from a rechargeable battery or a fixed electrical power supply outlet (e.g., see FIGS. 2-3, infra)—or a hybrid gas/electric power supply, or other suitable power supply.

Snow thrower apparatus 100 can include a pair of graspable handles 110 extending from a frame 116. Handles 110 can be used by an operator to control direction and movement of snow thrower apparatus 100 and can support a control panel 120 having one or more operator controls configured to actuate various implements of snow thrower apparatus 100. For instance, control panel 120 can comprise a drive actuator to cause movable members 105 to move snow thrower apparatus 100 along a surface, a snow removal actuator to activate an auger 160 to intake snow (or other material) from the surface and to activate an impeller (not depicted, but see FIGS. 9-11, infra) to expel the snow (or other material) from snow thrower apparatus 100. Additionally, control panel 120 can comprise one or more actuators to adjust a transmission and drive speed of movable members 105, impeller speed of the impeller, auger speed of auger 160, orientation of a chute 140 or angle of chute deflector 145, or the like, or a suitable combination of the foregoing.

In more detail, movable members 105 can be driven by a transmission powered by power supply 130 and secured to frame 116. Snow thrower apparatus 100 can include snow removal implements configured to remove snow (or other material) from a surface on which snow thrower apparatus 100 rests. Removing snow can be accomplished by collecting the snow within an auger housing opening 152 secured to frame 116 in response to movable members 105 moving snow thrower apparatus 100 upon the surface. Snow collected within auger housing opening 152 is moved toward a central and rear portion of auger housing 150 to an output of auger housing 150 in response to actuation (e.g., rotation) of auger 160. An intake portion of an impeller housing is adjacent to and fluidly coupled with the output of auger housing 150 (see, e.g., FIGS. 2 and 9, infra). Snow moved to the output of auger housing 150 by auger 160 is acquired by an impeller (see, e.g., FIGS. 9-11). In response to actuation of the impeller, the snow acquired by the impeller is ejected from chute 140 in a direction defined by chute 140 and in an orientation defined generally by chute deflector 145.

In the embodiment depicted by FIG. 1, auger housing 150 can be generally semi-cylindrical in cross-section (e.g., viewed from the side), C-shaped, or the like and includes a recess defined by auger housing opening 152 that extends rearwardly through the auger housing 150. In addition, auger housing 150 is laterally oriented with respect to the longitudinal axis and fore/aft movement of snow thrower apparatus 100. Auger housing 150 can be formed of a metal, metal alloy, plastic, metal-plastic composite material, or other suitable material having sufficient strength and structural integrity to maintain its structure within low temperatures (e.g., below 0 degrees Celsius) while supporting mechanically driven auger 160, an auger motor drive and an auger-impeller drive exchange (e.g., see FIGS. 8, 8A and 9, infra), and withstanding rocks, ice and other material that can enter auger housing 150 and be driven by auger 160 or ejected by the impeller. Auger housing 150 further includes a forwardly-directed auger housing opening 152 into which snow (and other material) enters augers housing 150 and an output located central and rearwardly of auger housing 150.

As utilized herein, relative terms or terms of degree such as approximately, substantially or like relative terms such as about, roughly and so forth, are intended to incorporate ranges and variations about a qualified term reasonably encountered by one of ordinary skill in the art in fabricating, compiling or optimizing the embodiments disclosed herein to suit design preferences, where not explicitly specified otherwise. For instance, a relative term can refer to ranges of manufacturing tolerances associated with suitable manufacturing equipment (e.g., injection molding equipment, extrusion equipment, metal stamping equipment, and so forth) for realizing a mechanical structure from a disclosed illustration or description. In some embodiments, depending on context and the capabilities of one of ordinary skill in the art, relative terminology can refer to a variation in a disclosed value or characteristic; e.g., a 0 to five-percent variance or a zero to ten-percent variance from precise mathematically defined value or characteristic, or any suitable value or range there between can define a scope for a disclosed term of degree. As an example, snow thrower apparatus 100 can eject snow from an impeller housing a disclosed distance, or substantially the disclosed distance: such as the disclosed distance with a variance of 0 to five-percent or 0 to ten-percent; a disclosed mechanical dimension can have a variance of suitable manufacturing tolerances as would be understood by one of ordinary skill in the art, or a variance of a few percent about the disclosed mechanical dimension that would also achieve a stated purpose or function of the disclosed mechanical dimension. These or similar variances can be applicable to other contexts in which a term of degree is utilized herein such as power consumption of a motor, speed of a disclosed motor in rotations per minute (or other suitable metric), accuracy of measurement of a physical effect (e.g., a snow throw distance, a relative torque output, a relative electric power consumption, a relative motor speed, etc.) or the like.

Figure 2:
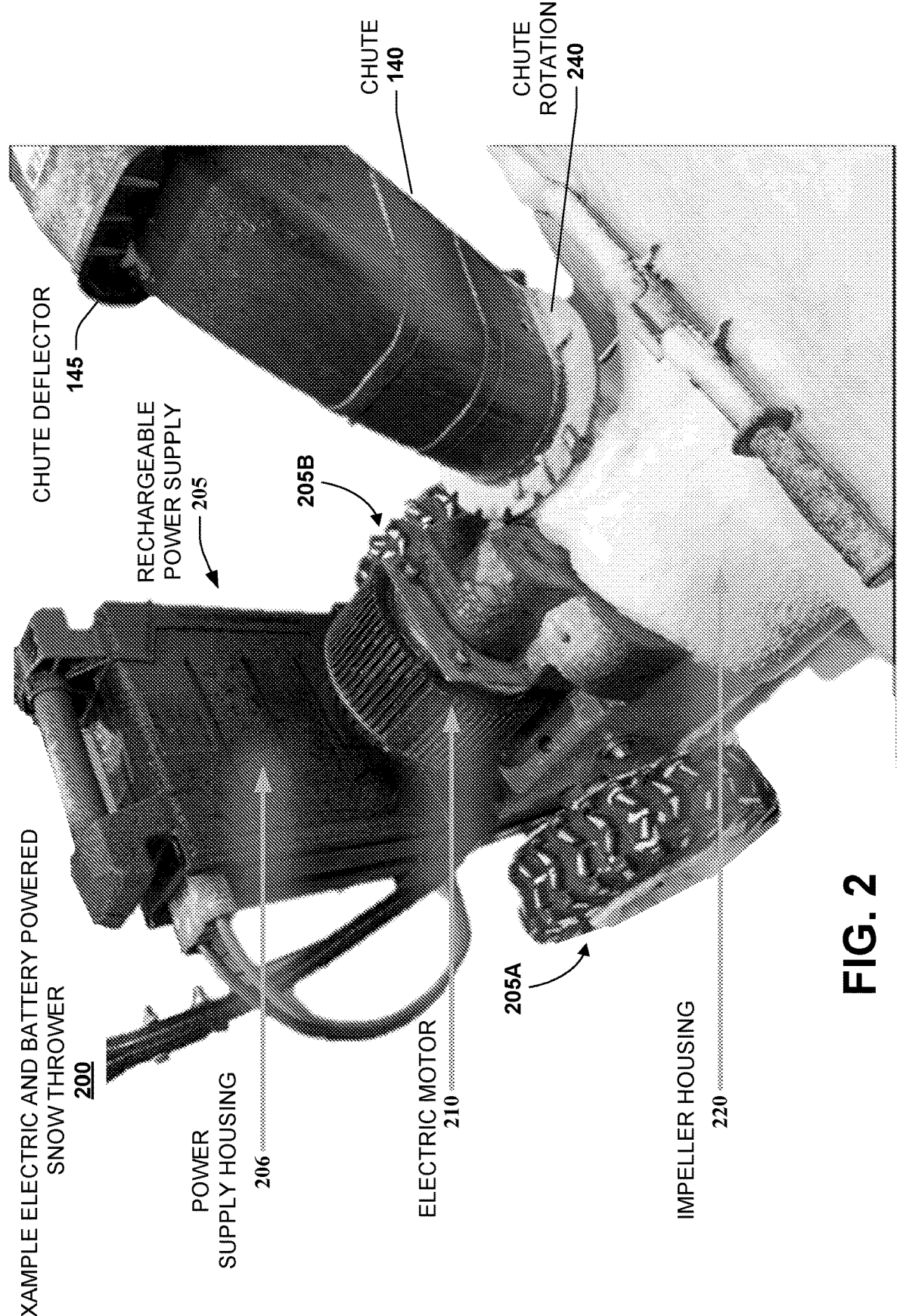
FIG. 2 provides an illustration of an example battery-powered electric snow thrower apparatus, in accordance with other aspects of the present disclosure.

FIG. 2 illustrates an example high efficiency (HE) snow thrower apparatus 200 according to alternative or additional aspects of the disclosed embodiments. HE snow thrower apparatus 200 can comprise an electric motor 210 that receives electrical power as an input and outputs mechanical power. In the embodiment illustrated by FIG. 2, HE snow thrower apparatus 200 includes a rechargeable power supply 205 having a power supply housing 206 along with electrical wiring to supply the electrical power as the input to electric motor 210. In other aspects of the embodiment of FIG. 2, electric motor 210 can also (or alternatively) be corded to receive electrical power from a cord coupled to a fixed electric power supply, or a semi-mobile electric power generator or electric power distributor.

In an embodiment, electric motor 210 can be configured to generate mechanical power to drive one or more implements of snow thrower apparatus 100. Electric motor can be operable to mechanically drive one or more of: movable members 105 (including a left wheel 205B and a right wheel 205A; referred to hereinafter collectively as wheels 205A, B), an auger(s) (e.g., auger 160) within an auger housing (e.g., auger housing 150), one or more auger stages of a multi-stage auger (e.g., auger 160) within the auger housing, an impeller within an impeller housing 220, a chute rotation drive (e.g., see FIG. 6, infra) mechanically coupled to chute 140 for rotating chute 140 about a chute rotation axis 240, an optional impeller boost-mode drive, a chute deflector actuator coupled to chute deflector 145 (e.g., see FIG. 6), or the like. In alternative or additional embodiments, one or more additional electric motors can be included with HE snow thrower apparatus 200 to provide mechanical power to drive the auger, one or more auger stages, the impeller, the optional impeller boost-mode drive, a chute rotation drive or a chute deflector actuator (e.g., see FIGS. 8, 8A and 9, infra). These one or more additional electric motors can be operated independently from electric motor 210 or can be inter-operated as a multi-motor drive system by one or more motor controllers (e.g., see FIG. 13, infra). In alternative embodiments, the auger, one or more auger stages, impeller, impeller boost-mode drive, chute rotation drive or chute deflector actuator can be manually actuated by an operator. For instance, an auger(s) or impeller can be mechanically coupled to rotation of wheels 205A, B and actuated in response to an operator manually pushing snow thrower apparatus 100, in an aspect; a chute rotation drive can be actuated in response to the operator manually rotating a crank-drive mechanically coupled to the chute rotation drive in another aspect, a chute deflector actuator can be manually actuated by the operator in yet another aspect, and so forth.

Control panel 120 or the like can be coupled with HE snow thrower apparatus 200 in various aspects of the disclosed embodiment(s). Control panel 120 can include a set of actuators to couple power from electric motor(s) 210 of HE snow thrower apparatus 100 to drive the auger, one or more auger stages, impeller, impeller boost-mode, chute rotation drive or chute deflector actuator. In some aspects, an actuator can mechanically couple (e.g., by way of a clutch, an electro-mechanical switch, or other suitable mechanism) a motor drive output by electric motor(s) 210 with a drive input of an implement device(s) to accomplish actuating the implement device(s). In other aspects, an actuator can modify a mechanical coupling (e.g., a drive ratio, rotation coupling ratio, or the like) between the motor drive and the drive input of an implement device(s) to actuate the function of the drive(s) (e.g., see FIG. 4B, infra and description of boost-mode drive). In still other aspects, an actuator can turn on, initiate or otherwise start an electric motor and cause the electric motor to output mechanical power to actuate an implement device to accomplish actuating the function of the drive.

In addition to the foregoing, some aspects provide a single actuator to engage multiple drive functions. To illustrate, a single snow removal actuator on control panel 120 can engage both an auger drive to operate the auger (or multiple auger stages) and an impeller drive to operate the impeller. The auger drive and impeller drive (optionally a combined auger+impeller drive, see FIGS. 10, 14 and 14A for illustrative examples) can be powered by a single motor, motor drive and mechanical coupling (e.g., see FIGS. 3, 10, 14 and 14A infra) in some embodiments, allowing the single snow removal actuator to engage the auger drive and impeller drive via the single motor. In an alternative embodiment, the auger can be powered by an auger motor and auger drive independently from an impeller motor and impeller drive that powers the impeller (e.g., see FIGS. 8, 8A and 9, infra). The auger motor and impeller motor can still be activated by a single snow removal actuator in this embodiment, though separate controls over auger motor power, impeller motor power, auger drive speed or impeller drive speed can readily be accomplished in this embodiment (e.g., see FIGS. 4, 5 and 6, infra). In yet another embodiment, a single motor can power separate auger and impeller drives, which separately drive the auger and impeller from mechanical power generated by the single motor, or multiple motors can power a combined auger+impeller drive (for instance: a first of the motors can run a normal operating mode for the auger+impeller drive and a second motor can be engaged to increase drive speed and power for a boost-mode; see, e.g., FIG. 4B). Each of these implementations can be engaged by a single actuator, although a separate boost-mode actuator can be utilized in addition to the snow removal actuator to activate the boost-mode drive. As another example of a single actuator engaging multiple drives, a single throw distance actuator can control an impeller speed (e.g., by impeller motor output or motor-impeller coupling ratio) and control the chute deflector actuator to achieve a selected snow throw distance (or range of snow throw distances) (e.g., see FIGS. 4, 5 and 6).

As alternative or additional aspects, a single actuator can implement a single drive function. To illustrate: a single movement actuator can engage wheels 205A, B (or other movable members 105) of HE snow thrower apparatus 200. As another illustration: a single chute rotation actuator can rotate chute 140 about chute rotation axis 240. Likewise, although operative with other snow removal implements engaged by other actuators, a boost-mode actuator can be responsible for a single drive function: a boost-mode.

Figure 3:
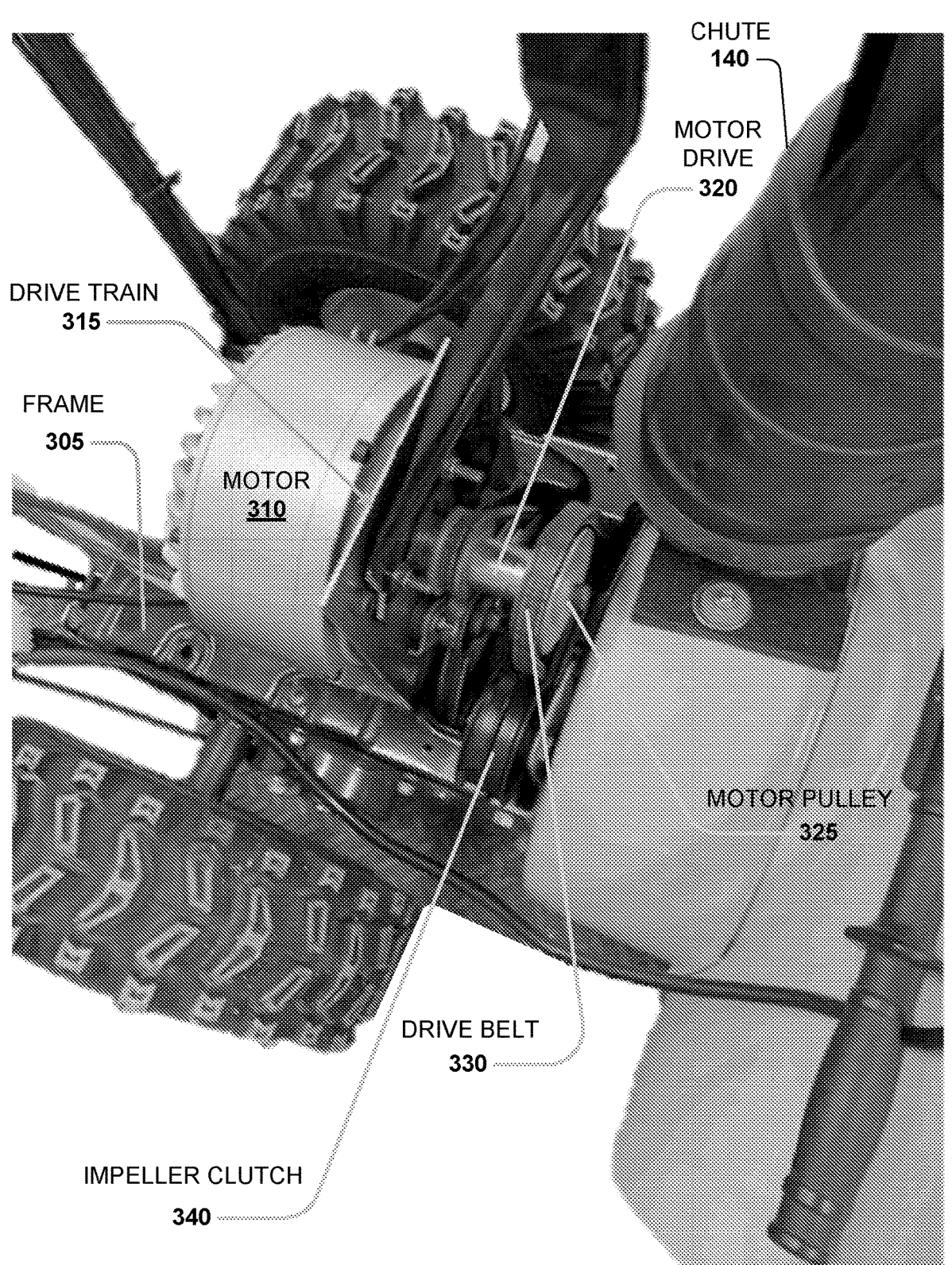
FIG. 3 depicts a top perspective view of an example battery-powered electric snow thrower apparatus according to further aspects disclosed herein.

FIG. 3 depicts a HE snow thrower apparatus 300 according to further aspects of the disclosed embodiments. HE snow thrower apparatus 300 includes an overhead view of HE snow thrower apparatus 300 with an implement drive cover removed showing a mechanical drive train providing mechanical power to a snow removal implement(s) of HE snow thrower apparatus 300. In one aspect, the snow removal implement(s) includes an impeller of HE snow thrower apparatus 300. In another aspect, the snow removal implement(s) includes both the impeller and an auger, or both the impeller and one or more stages of a multi-stage auger.

HE snow thrower apparatus 300 depicts an electric motor 310 mounted and secured to a frame 305 of HE snow thrower apparatus 300. Electric motor 310 receives electrical power as an input and outputs mechanical power. A drive train 315 is provided to couple the mechanical power output by electric motor 310 to a snow removal implement(s). At the output of electric motor 310 is a motor drive 320 terminating in a motor pulley 325. Motor drive 320 and motor pulley 325 are secured to an output of electric motor 310 and configured to rotate as part of the mechanical power output by electric motor 310.

A drive belt 330 is seated at motor pulley 325 and is also in contact with an impeller clutch 340. Impeller clutch 340 can be engaged or disengaged utilizing a suitable operator control at control panel 120 or handles 110, in an embodiment (e.g., see FIG. 1, supra). When engaged, impeller clutch 340 can increase tension between drive belt 330 and an impeller pulley (not depicted, but which can be located beneath motor pulley 325 and impeller clutch 340). When disengaged, tension between drive belt 330 and the impeller pulley is relaxed. In response to rotation of motor pulley 325 and engagement of impeller clutch 340, drive belt 330 causes the impeller pulley (not visible) to rotate. The impeller pulley can be mechanically coupled to an impeller drive and impeller causing rotation of the impeller in response to rotation of motor pulley 325 (and engagement of impeller clutch 340). For instance, FIG. 10 shows an impeller drive 1055 mechanically coupled to high efficiency impeller 950.

Motor drive 320, motor pulley 325, drive belt 330, the impeller pulley and impeller clutch 340 provide one example motor drive/impeller coupling ratio according to aspects of the disclosed embodiments. A number of rotations of motor pulley 325 can be associated with a second number of rotations of the impeller pulley, defining a first rotation rpm for motor drive 320 and a second rotation rpm for the impeller pulley and an impeller drive (e.g., impeller drive 1055) coupled to the impeller pulley. For instance, a suitable range of motor drive/impeller coupling ratios can be from about 2 rotations to 1 to about 5 rotations to 1, or any suitable value or range there between (e.g., ~3:1, ~3.5:1, ~4:1, ~4.5:1, etc.). In an embodiment, motor drive 320 or the impeller drive can include a variable rotation gear, variable rotation pulley or the like (not depicted) that allows a transition between a suitable range of motor drive/impeller coupling ratios in response to an actuator at control panel 120 (e.g., in response to impeller motor control actuator 412 of FIG. 4, infra). In another embodiment, motor drive 320 or the impeller drive can include an additional rotation pulley, gear or the like, or an additional drive train that can be utilized to implement a second coupling ratio different from the example motor drive/impeller coupling ratio introduced above. In still further embodiments, a first motor drive/impeller coupling ratio can be provided for a normal impeller operating mode in which a motor drive speed of motor drive 320 can be increased or decreased to effect changes in impeller speed at the first motor drive/impeller coupling ratio, and a second coupling ratio can be implemented to engage a second operating mode different from the operating mode (e.g., a boosted operating mode).

It should be appreciated that in some aspects of the present disclosure, an impeller drive (e.g., the impeller drive 1055 of FIG. 10) can be independent of and not operationally coupled to auger drive 1045. In such aspects, the impeller drive and impeller are powered by motor drive 320 and motor pulley 325, whereas the auger and auger drive can be powered at least by a separate auger drive, and optionally by a separate auger motor (see, e.g., FIGS. 8, 8A and 9). In other aspects, the separate auger drive can also be powered by electric motor 310, for instance by way of an independent mechanical coupling to motor pulley 325, drive belt 330, motor drive 320 or electric motor 310, or a suitable combination of the foregoing.

Figure 4:
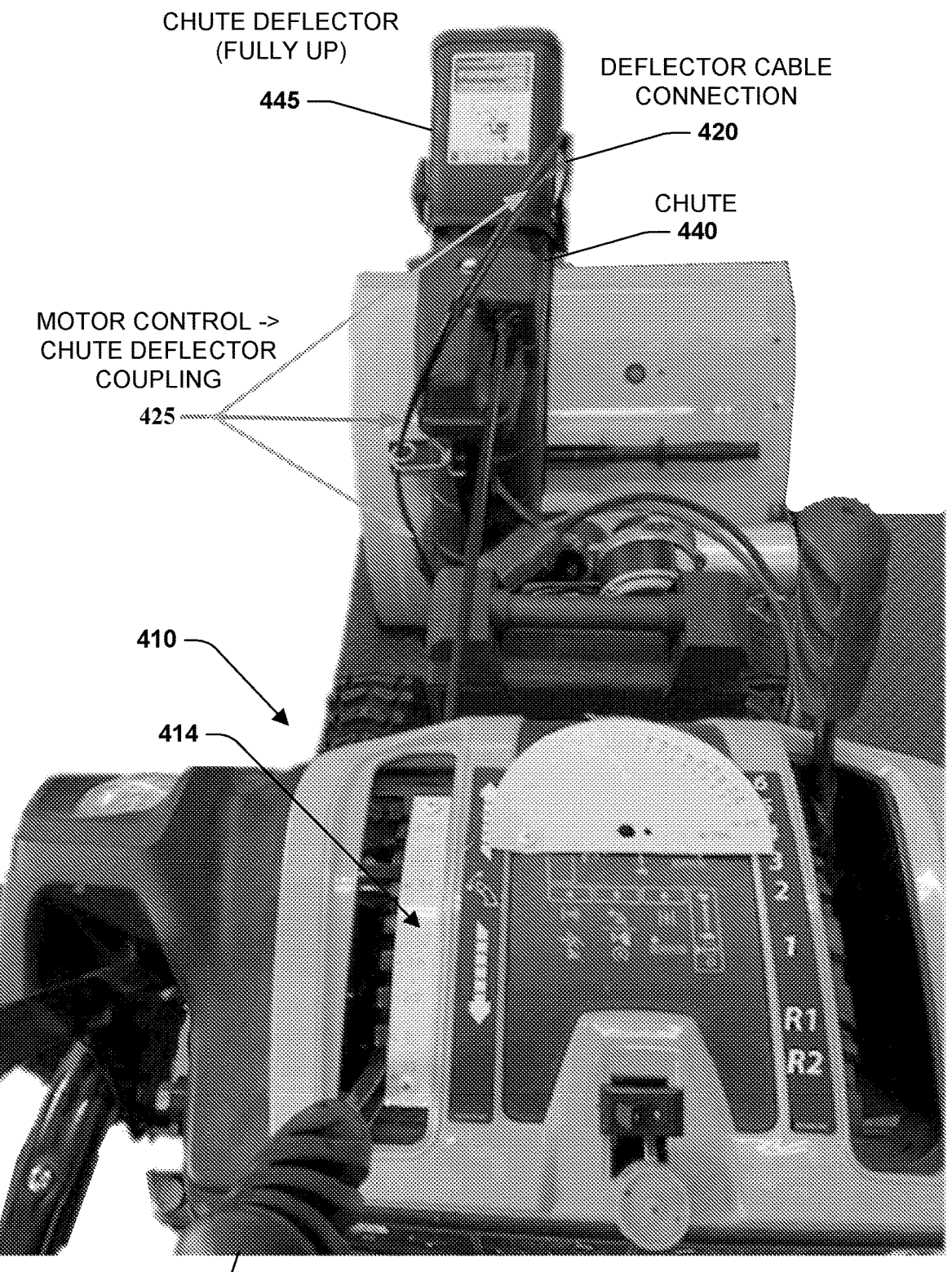
FIG. 4 depicts an operator perspective view of a snow thrower apparatus with impeller power and chute deflector orientation set at high power.

FIG. 4 depicts an operator perspective view of a sample HE snow thrower apparatus 400 according to further embodiments of the present disclosure. HE snow thrower apparatus 400 includes an operator control panel 410. Operator control panel 410 provides various controls, actuators and the like for enabling an operator to activate or deactivate the implements of HE snow thrower apparatus 400. As described throughout this specification, such implements can include an implement for moving HE snow thrower apparatus 400 on a surface (e.g., wheels 205A, B and a wheel drive transmission—not depicted), a snow removal implement(s) for receiving snow from the surface and ejecting the snow from HE snow thrower apparatus 400, an impeller speed control implement, a chute rotation implement, a chute deflector orientation implement, or a boost-mode implement, or the like, or a suitable combination of the foregoing.

In the depiction of FIG. 4, there is shown an impeller motor control actuator 412 in a high power (or high speed) position, indicated by impeller speed range 414. An operator can move impeller motor control actuator 412 to various positions on the impeller speed range 414 to cause an impeller of HE snow thrower apparatus 400 to operate at different rotations per minute (rpms), at different power consumption levels, or other suitable metric. As an illustrative example, though not provided to limit the scope of the present disclosure, the impeller speed range 414 can operate an impeller of HE snow thrower apparatus 100 within a normal operating range. The normal operating range can correspond with motor drive speeds (e.g., of motor drive 320 of FIG. 3, supra) between a lower range of about 1000 rpms to 1400 rpms (e.g., 1200 rpms, 1250 rpms, 1300 rpms, or any suitable value or range between 1000-1400 rpms) and an upper range of about 1700 rpms to 2300 rpms (e.g., 1900, 1950, 2000, 2050, 2100 rpms, or any suitable value or range between 1700-2300 rpms). Alternatively (or in addition), the normal operating range can be associated with electric power consumption of HE snow thrower apparatus 400 between a lower range of about 0.5 kilowatts (kW) and 0.7 kW (e.g., 0.6 kW, etc.) and an upper range of about 1 kW to about 1.5 kW (e.g., 1.1 kW, 1.2 kW, 1.3 kW, etc.). Impeller motor control actuator 412 can adjust impeller speed and power consumption of the apparatus throughout the normal operating range, from the lower range to the upper range. This enables the operator to select an overall power consumption versus performance efficiency of HE snow thrower apparatus 400 to suit various snow conditions. Where conditions require, impeller motor control 412 can be moved toward the higher range to eject heavier snow or throw the snow a larger distance and where conditions permit impeller motor control 412 can be moved toward the lower range to shorten the throw distance and increase battery longevity, for example (which can be applicable to any of the disclosed embodiments when configured with an electric motor(s) supplied by a rechargeable battery).

In additional aspects of the subject disclosure, impeller motor control 412 can also engage a chute deflector actuator configured to change a chute deflector orientation from a downward position to an uppermost position. In the depiction of FIG. 4, a chute deflector 445 is shown in the fully up position, which can be coupled to impeller motor control 412 in the high power (or high impeller speed) position. For instance, a motor control→chute deflector coupling 425 can be responsive to impeller motor control 412 (e.g., see FIG. 7, infra) such that moving impeller motor control 412 actuator to the high power position on impeller speed range 414 causes motor control→chute deflector coupling 425 to engage a deflector cable connection 420 and orient chute deflector 445 in the fully up position shown in FIG. 4. Similarly, moving impeller motor control 412 to a low power position on impeller speed range 414 causes motor control→chute deflector coupling 425 to orient chute deflector 445 in a fully down position (e.g., see FIG. 5, infra) and moving impeller motor control 412 to various mid-range positions between the high power position and low power position causes motor control→chute deflector coupling 425 to orient chute deflector 445 in various positions between the fully up position and the fully down position (e.g., see FIG. 6, infra). In these aspects then, HE snow thrower apparatus 400 enables an operator to select between various throw distance ranges by way of impeller motor control 412. In the lowest power position impeller motor control 412 adjusts chute deflector 445 downward (via motor control→chute deflector coupling 425) toward the ground and reduces the impeller power and impeller speed to impart less kinetic energy to the snow ejected from chute 440, achieving a low snow throw distance range (see FIG. 5A, infra). In the high power position shown in FIG. 4 impeller motor control 412 adjusts chute deflector 445 fully upward and increases the impeller power and impeller speed to impart high kinetic energy to the snow ejected from chute 440, achieving a high snow throw distance range (see FIG. 4A, infra). Where implemented, a boost-mode actuator can be provided for HE snow thrower apparatus 400 to increase impeller speed and power above the range established by impeller motor control 412, whether in the low power position or the high power position in one or more aspects of the disclosed embodiments.

Figure 4A:
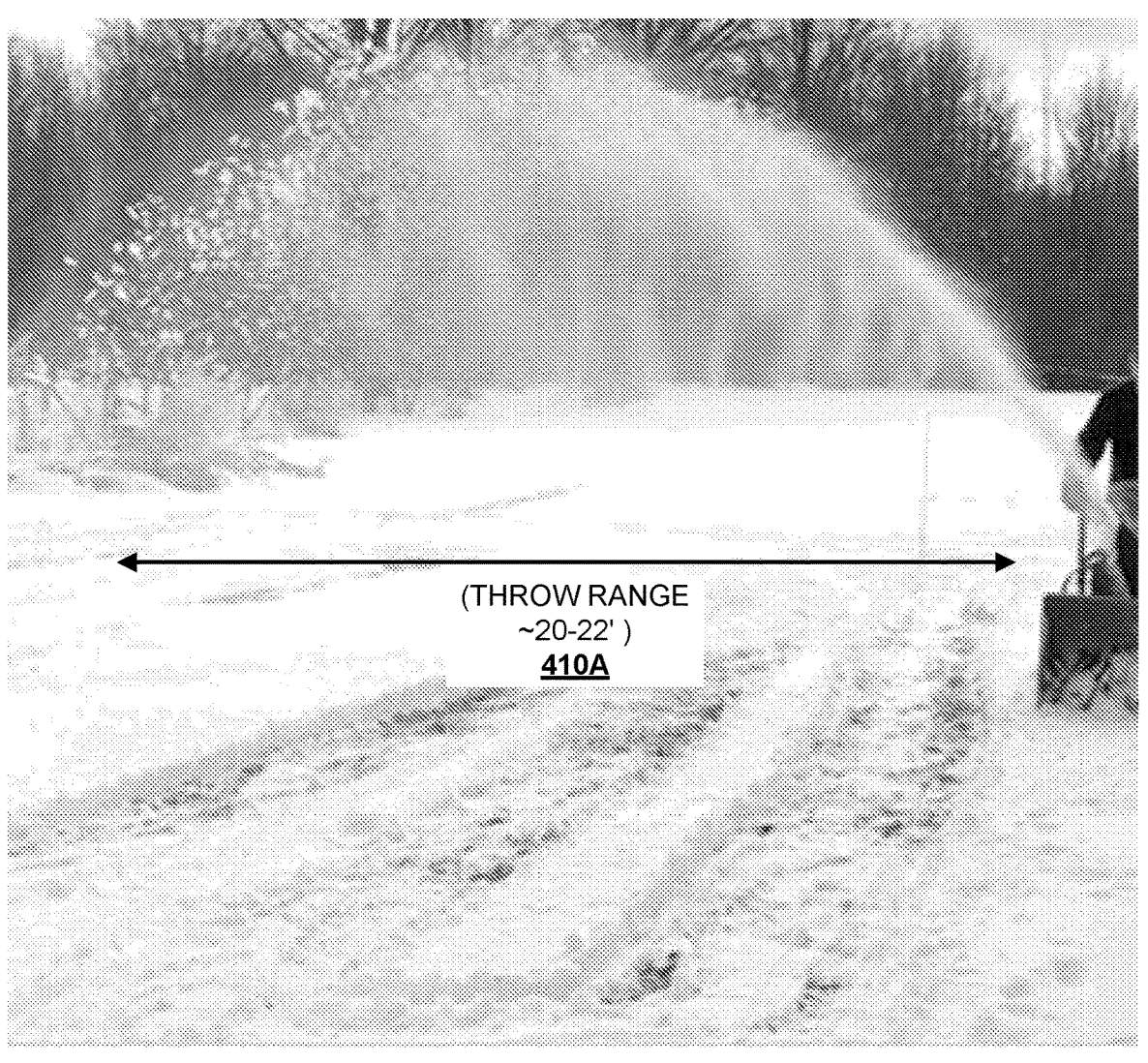
FIG. 4A depicts a throw range of the snow thrower apparatus of FIG. 4 with impeller power and chute orientation in high (non-boost) performance mode.

FIG. 4A illustrates an example snow throw range at high power 400A for a disclosed HE snow thrower apparatus according to aspects of the disclosed embodiments. The measured throw range 410A was between about twenty (20) and about twenty-two (22) feet. The throw range 410A corresponds with an HE snow thrower apparatus in a high speed impeller mode such as depicted in FIG. 4, supra. Moreover, the throw range 410A is comparable to snow thrower apparatuses with gasoline combustion engines operating at 3500 rpm with a snow throw range of about 22 feet (e.g., see FIG. 12, infra). Power consumption for throw range 410A can be in a range from about 1 kW to about 1.5 kW (e.g., 1.3 kW, or any suitable value or range there between) with a motor rpm of about 1700-2300 rpm (including any suitable value or range there between). In an embodiment, snow throw range 410A can correspond to a snow thrower such as HE snow thrower apparatus 400 of FIG. 4 incorporating a HE impeller disclosed herein (e.g., see FIGS. 10 and 11).

Figure 4B:
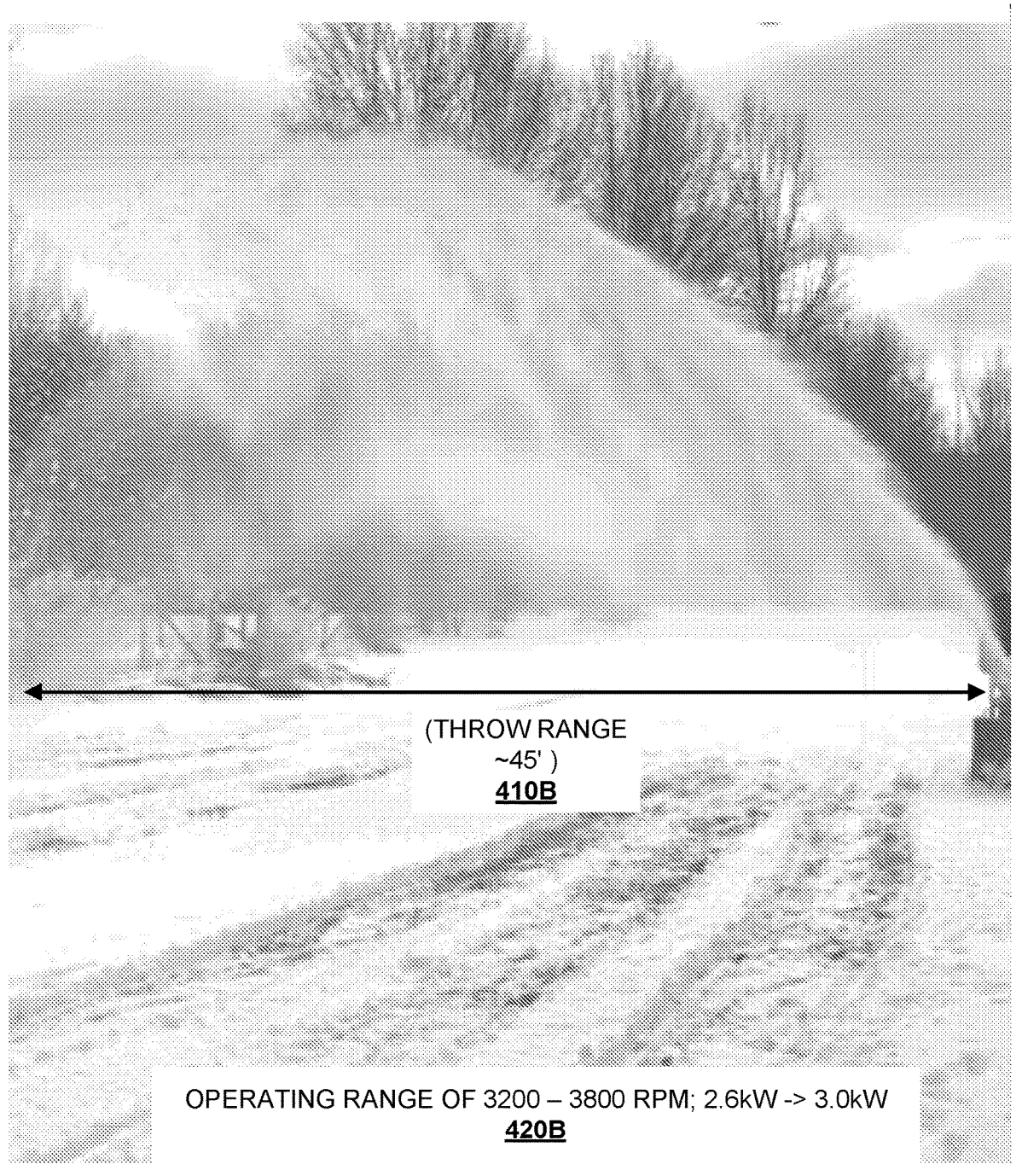
FIG. 4B illustrates a throw range of the snow thrower apparatus of FIG. 4 in a boosted high performance mode, in at least one disclosed aspect.

FIG. 4B illustrates an example snow throw range 400B of a disclosed HE snow thrower apparatus incorporating an optional boost-mode. For instance, snow throw range 400B can correspond to HE snow thrower apparatus 400 incorporating a disclosed HE impeller and operating at the high power setting of impeller motor control 412, with an optional boost mode activated. The optional boost-mode can be configured to increase a rotation speed of an impeller implement above a high impeller speed setting for a normal operating range of the impeller apparatus to a boosted impeller speed. The boosted impeller speed can achieve very high throw distances: up to about forty-five (45) feet as shown in FIG. 4B. Increasing the rotation speed of the impeller implement can be achieved in different manners according to various embodiments of the present disclosure.

As one example, a disclosed boost-mode actuator can modify a mechanical coupling ratio (e.g., drive train 315) between an electric motor (e.g., electric motor 210) and a HE impeller (e.g., HE impeller 950 of FIG. 10, infra) to achieve increased rotation speed of the impeller implement associated with the boosted impeller speed. More specifically, the disclosed boost-mode actuator can change a normal operating drive/impeller rotation per minute (rpm) coupling ratio to a boosted drive/impeller rpm coupling ratio that increases an impeller rotation speed to the boosted impeller speed. This increased impeller rotation speed can be accomplished for a constant motor drive rpm (e.g., motor drive 320) in response to modifying the mechanical coupling ratio in at least one embodiment—though the subject disclosure is not limited to this implementation. Upon de-actuation of the boost-mode actuator, the mechanical coupling between the electric motor and HE impeller can revert from the boosted drive/impeller rpm coupling ratio to the normal operating drive/impeller rpm coupling ratio. In turn, the boosted operating speed of the impeller can likewise revert to the normal operating speed of the impeller. (See, e.g., U.S. Pat. No. 10,087,592 issued Oct. 2, 2018, incorporated by reference hereinabove). As an illustrative example, a motor drive/impeller drive coupling ratio of about 3.5 to 1 can be utilized for the normal operating drive/impeller rpm coupling ratio. This coupling ratio can be maintained for the low impeller speed through the high impeller speed of the normal operating mode. In response to activation of a boost mode the motor drive/impeller drive coupling ratio can be changed to about 2 to 1 to implement the boosted impeller speed. Other motor drive/impeller drive coupling ratios (e.g., between about 2 and about 5 to 1) and boost mode coupling ratios (e.g., between about 1.5 and about 2.5 to 1) can be utilized in other aspects of the disclosed embodiments.

As another example, a disclosed boost-mode actuator can increase a motor drive speed of an electric motor providing the mechanical power to drive the impeller implement. As one specific illustrative example, a boost-mode actuator can increase a potentiometer output (e.g., see FIG. 7 infra) received by an electric motor (e.g., electric motor 310 of FIG. 3, supra) to cause a motor drive at an output of the electric motor (e.g., 320) to increase its rotation rate, thereby driving an impeller drive mechanically coupled to the motor drive at a faster rotation rate as well. Similar to the above, the motor drive rotation rate can be increased from a high range of normal operating speed (e.g., 1700-2300 rpm) to a boosted operating speed 420B (e.g., 3200-3800 rpm) when the boost-mode actuator is engaged. When the boost-mode actuator is disengaged, the potentiometer output can cause the electric motor to return to normal operating range rotation rate, thereby driving the impeller drive and impeller at the normal operating range rotation rate. In still further embodiments, the boost-mode actuator can implement a combination of increased motor drive speed and increased drive/impeller rpm coupling ratio to accomplish the increased impeller speed corresponding with snow throw range 400B illustrated in FIG. 4B.

The boosted operating range 420B of FIG. 4B can generate motor drive operating speed in a range of 3200-3800 rpm (or any suitable value or range there between). In addition, the boosted operating range 420B can incorporate a power consumption of about 2.6 kW to about 3.0 kW. Note that the motor drive operating speed range of boosted operating range 420B is comparable to gasoline engine snow thrower devices at a normal operating mode (~3500 rpm) of such devices, yet achieves double the snow throw range (e.g., about forty-five feet versus about twenty-two feet). Accordingly, disclosed HE snow thrower apparatuses can achieve significantly greater performance even at comparable operating speeds of comparable snow thrower devices.

Figure 5:
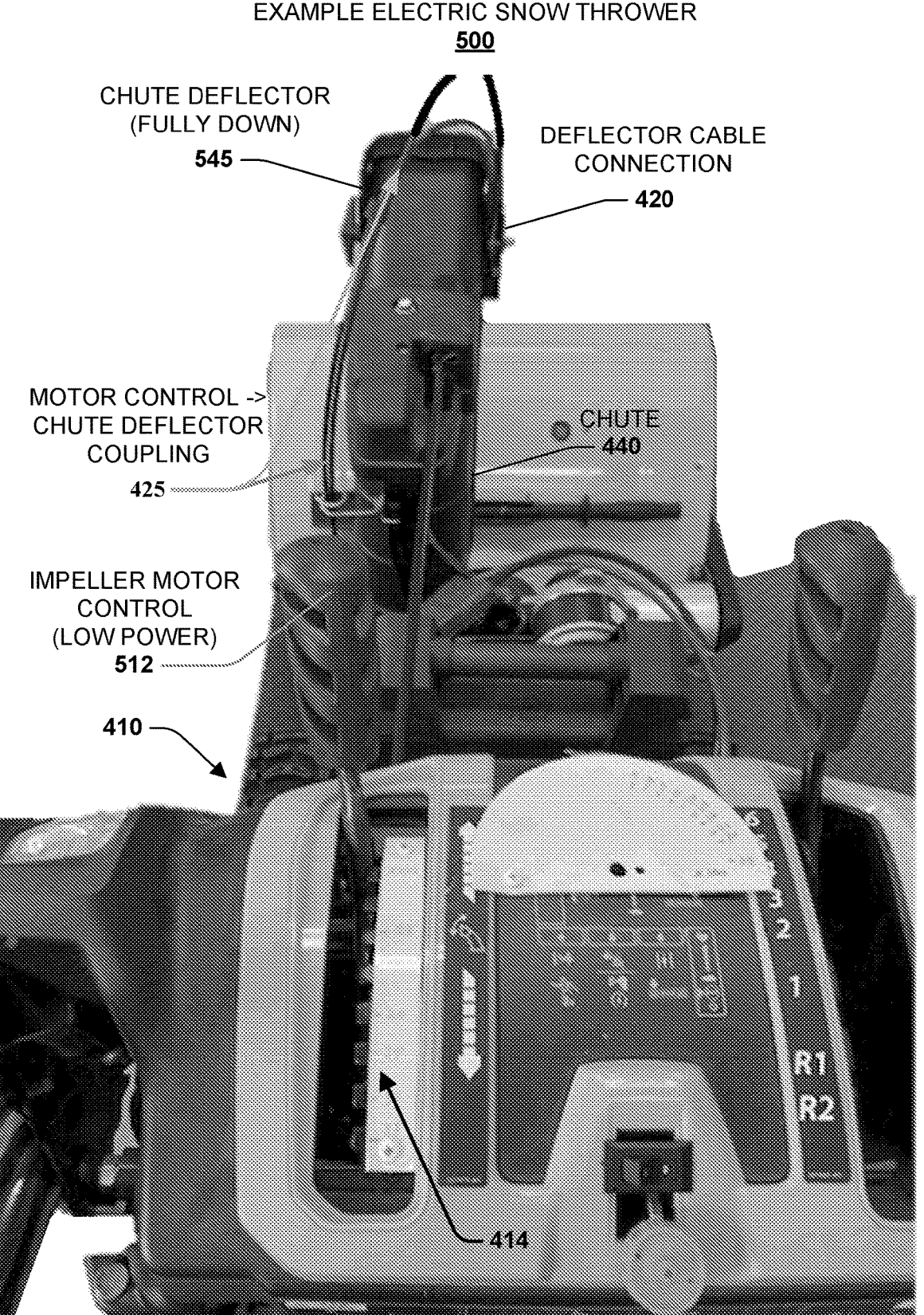
FIG. 5 depicts an operator perspective view of a snow thrower apparatus with impeller power and chute deflector orientation set at low power.

FIG. 5 depicts an operator perspective view of a sample HE snow thrower apparatus 500 according to further embodiments of the present disclosure. HE snow thrower apparatus 500 includes operator control panel 410, which can be substantially as described previously with respect to HE snow thrower apparatus 400. Further, there is shown an impeller motor control actuator 512 in a low power (or low speed) position, indicated by impeller speed range 414. This can serve to operate a motor drive of HE snow thrower apparatus 500 at a low speed operating range from between about 1000-1400 rpms, and a low power operating range from between about to about 0.7 kW. In some aspects of the illustrated embodiment(s), a motor control→chute deflector coupling 425 is provided that orients a chute deflector 545 by engaging a deflector cable connection 420 in response to positioning of impeller motor control 512 along impeller speed range 414. As depicted, when impeller motor control 512 is in the low power position motor control→chute deflector coupling 425 orients chute deflector 545 in a fully down position. This corresponds to a low snow throw range for HE snow thrower apparatus 500, shown in FIG. 5A.

Figure 5A:
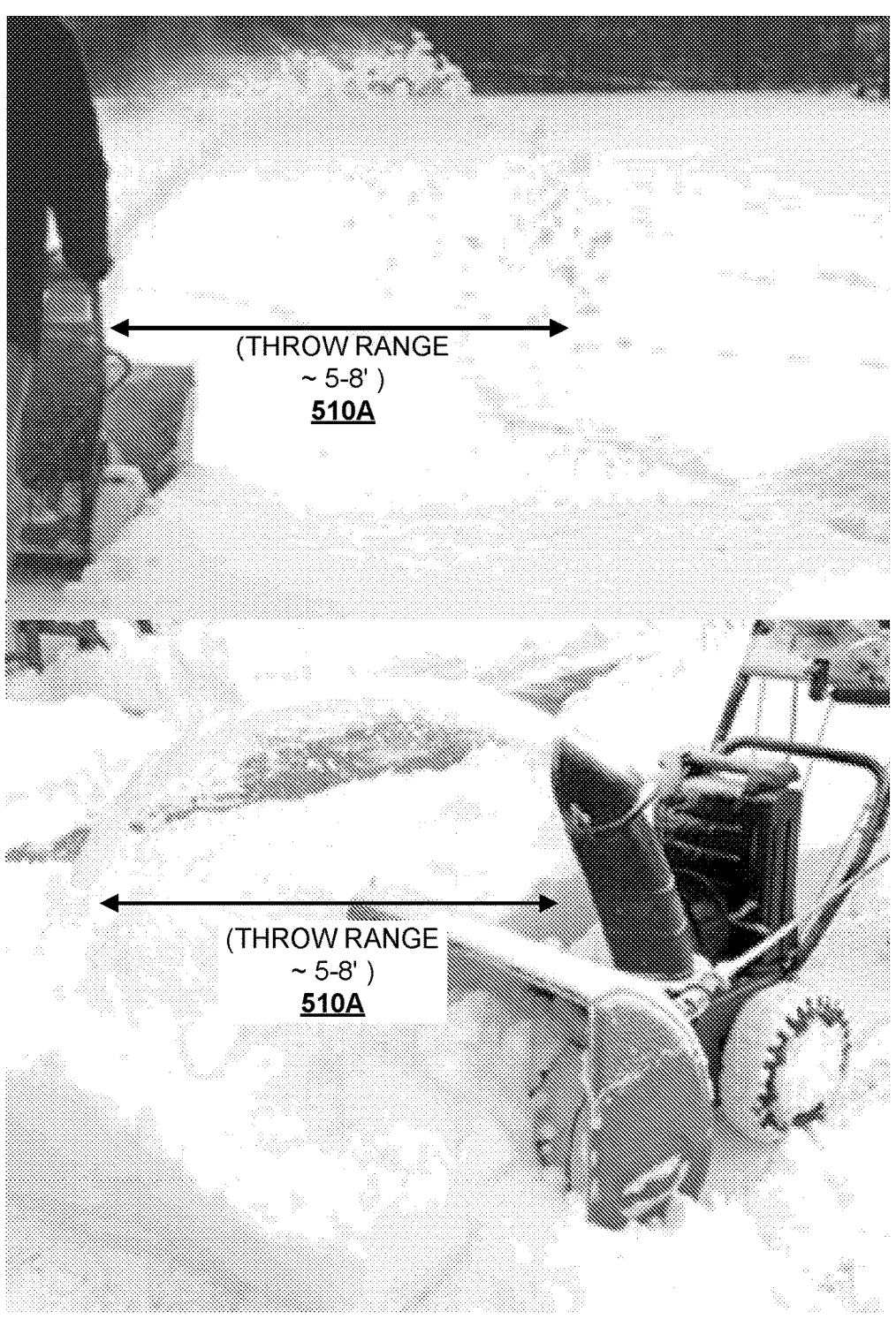
FIG. 5A depicts a throw range of the snow thrower apparatus of Figure with impeller power and chute orientation in low performance mode.

FIG. 5A depicts the snow throw range at low power 500A from two perspectives: a rear perspective at the top of FIG. 5A and a front-offset perspective at the bottom of FIG. 5A. Snow throw range at low power 500A has an effective throw range 510A from about five (5) to about eight (8) feet. Throw range 510A can be desirable in windy conditions, or where snow only needs to be moved a short distance to accomplish effective snow removal. Moreover, throw range 510A is associated with a very low power consumption of about 0.5 kW to about 0.7 kW (at a low end of normal operating range having motor drive speed of only 1000-1400 rpms). This can significantly increase battery duration for a battery-powered snow thrower apparatus, which can be implemented for any of the disclosed embodiments.

Figure 6:
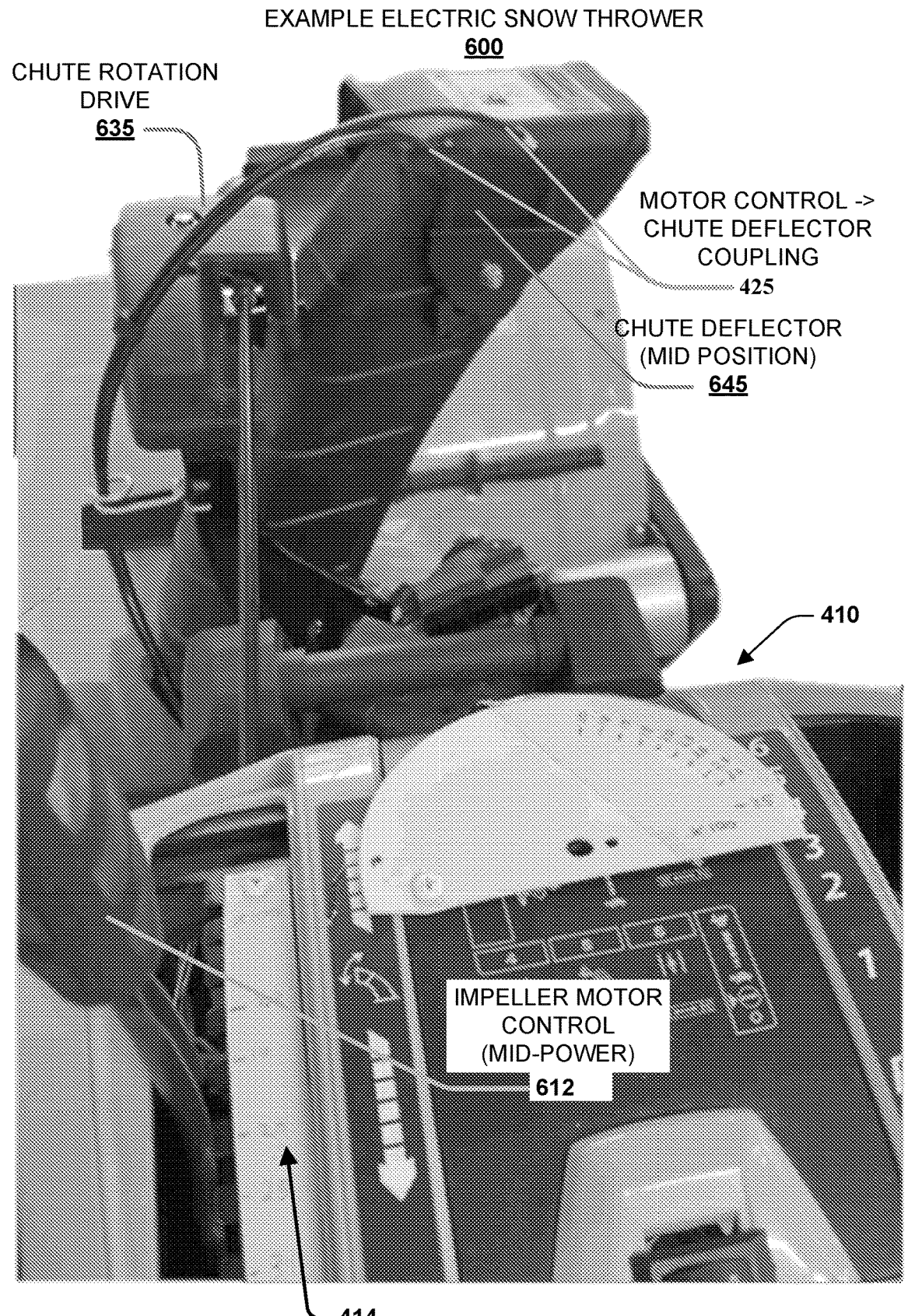
FIG. 6 illustrates an operator perspective view of a snow thrower apparatus with impeller power and chute deflector orientation set at mid power.

FIG. 6 depicts an operator perspective view of a sample HE snow thrower apparatus 600 according to further embodiments of the present disclosure. HE snow thrower apparatus 600 includes operator control panel 410, which can be substantially as described previously with respect to HE snow thrower apparatus 400. Further, there is shown an impeller motor control actuator 612 in a mid-power (or mid speed) position, as shown relative to impeller speed range 414. Positioning impeller motor control actuator 612 at the mid power position can serve to operate a motor drive of HE snow thrower apparatus 600 at a moderate speed operating range from between about 1300-1900 rpms, and a moderate power range from between about 0.7 kW to about 1.2 kW. In some aspects of the illustrated embodiment(s), a motor control→chute deflector coupling 425 is provided that orients a chute deflector 645 (e.g., by engaging a deflector cable connection 420—not depicted, but see FIGS. 4 and 5, supra) in response to positioning of impeller motor control 512 at various positions along impeller speed range 414 between the high power position 412 of FIG. 4 and the low power position 512 of FIG. 5. As depicted, when impeller motor control 612 is in the mid power position motor control-→chute deflector coupling 425 orients chute deflector 645 in a range of positions between a fully down position and a fully up position. This corresponds to a moderate snow throw range for HE snow thrower apparatus 600, smaller than the high snow throw range 410A shown in FIG. 4A and greater than the low snow throw range 510A shown in FIG. 5A.

In one or more additional aspects, HE snow thrower apparatus 600 can include a chute rotation drive 635. Chute rotation drive 635 can be operated in response to an actuator located at control panel 410. In one aspect, chute rotation drive 635 can be responsive to a manual actuator operated manually by an operator of HE snow thrower apparatus 600. In another aspect, chute rotation drive 635 can be responsive to a powered actuator (e.g., electric power—from one or more electric motors, pneumatic power, hydraulic power, and so forth) that can be engaged by an operator at control panel 410. Chute rotation drive 635 can serve to rotate chute 140 about a chute rotation axis 240 to control a direction of snow ejected from HE snow thrower apparatus 600.

Figure 7:
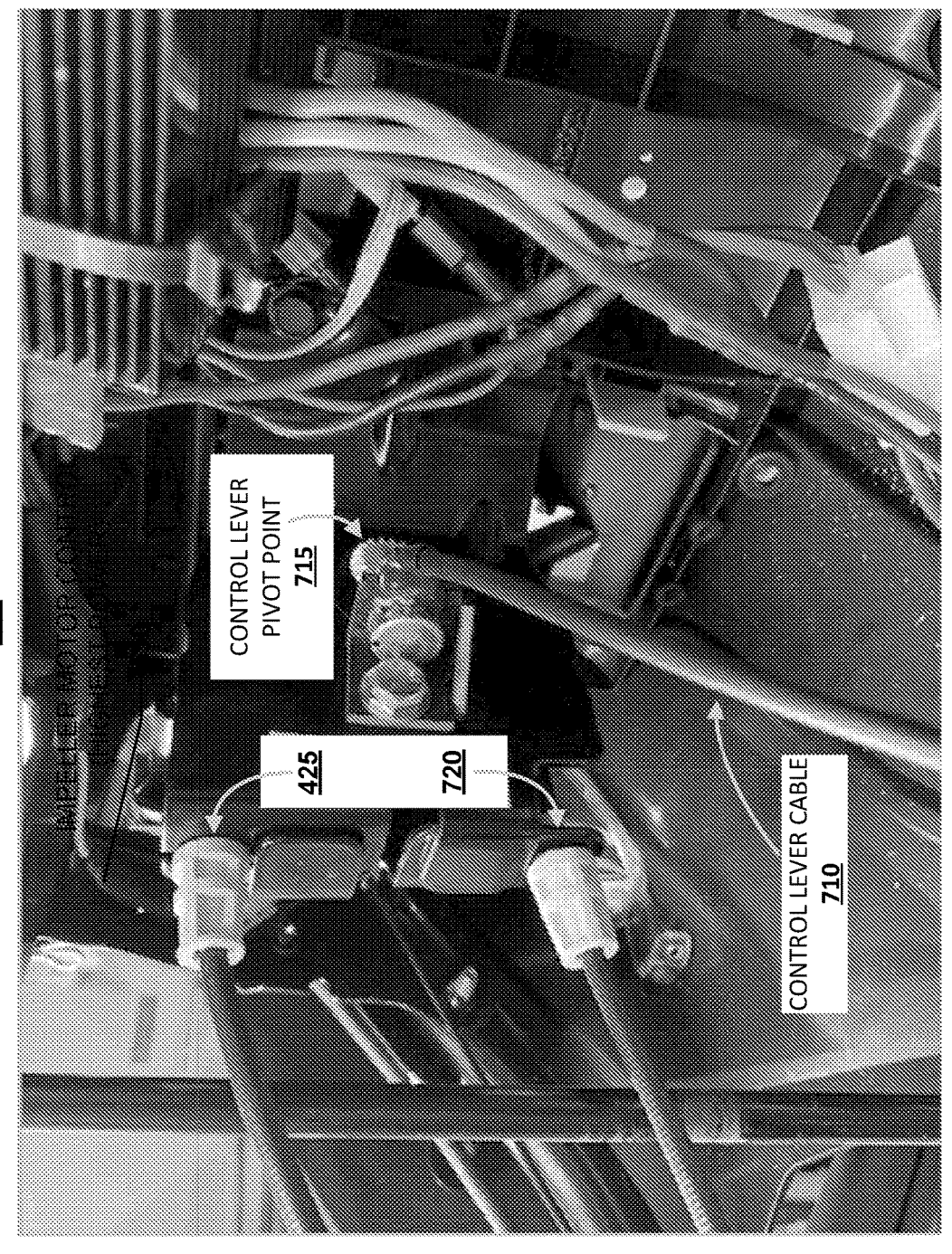
FIG. 7 depicts an underside of a control panel and impeller and chute deflection controls for a disclose snow thrower apparatus, in additional embodiments.

FIG. 7 provides an image of an example control panel wiring 700 for a control panel 410 of a disclosed HE snow thrower apparatus according to alternative or additional aspects of the disclosed embodiments. Control panel wiring 700 depicts a control lever cable 710, which can be responsive to an impeller motor control actuator of the control panel 410 as described hereinabove (e.g., impeller motor control 412, impeller motor control 512, impeller motor control 612). Control lever cable 710 can operate a control lever pivot point 715, which can vary an input to a potentiometer (in an electrical control context), an input to a spring or gear assembly (in a mechanical control context) or the like, or a suitable combination thereof. Control lever pivot point 715 can pivot between a range of control positions that correspond to a high impeller speed and high chute deflector orientation, and correspond to a low impeller speed and low chute deflector orientation, and various positions there between. A motor control→chute deflector coupling 425 is responsive to the control position of control lever pivot point 715 to adjust a chute deflector between the low chute deflector orientation and the high chute deflector orientation. Likewise, a speed control cable 720 is responsive to the control position of control lever pivot point 715 to adjust an impeller drive between a low impeller speed and a high impeller speed (and optionally a boosted impeller speed), as described herein. Thus, control panel wiring 700 illustrates one example embodiment for converting positions of an impeller motor control actuator to associated chute deflector orientations and impeller speeds according to one or more aspects of the present disclosure.

Figure 8:
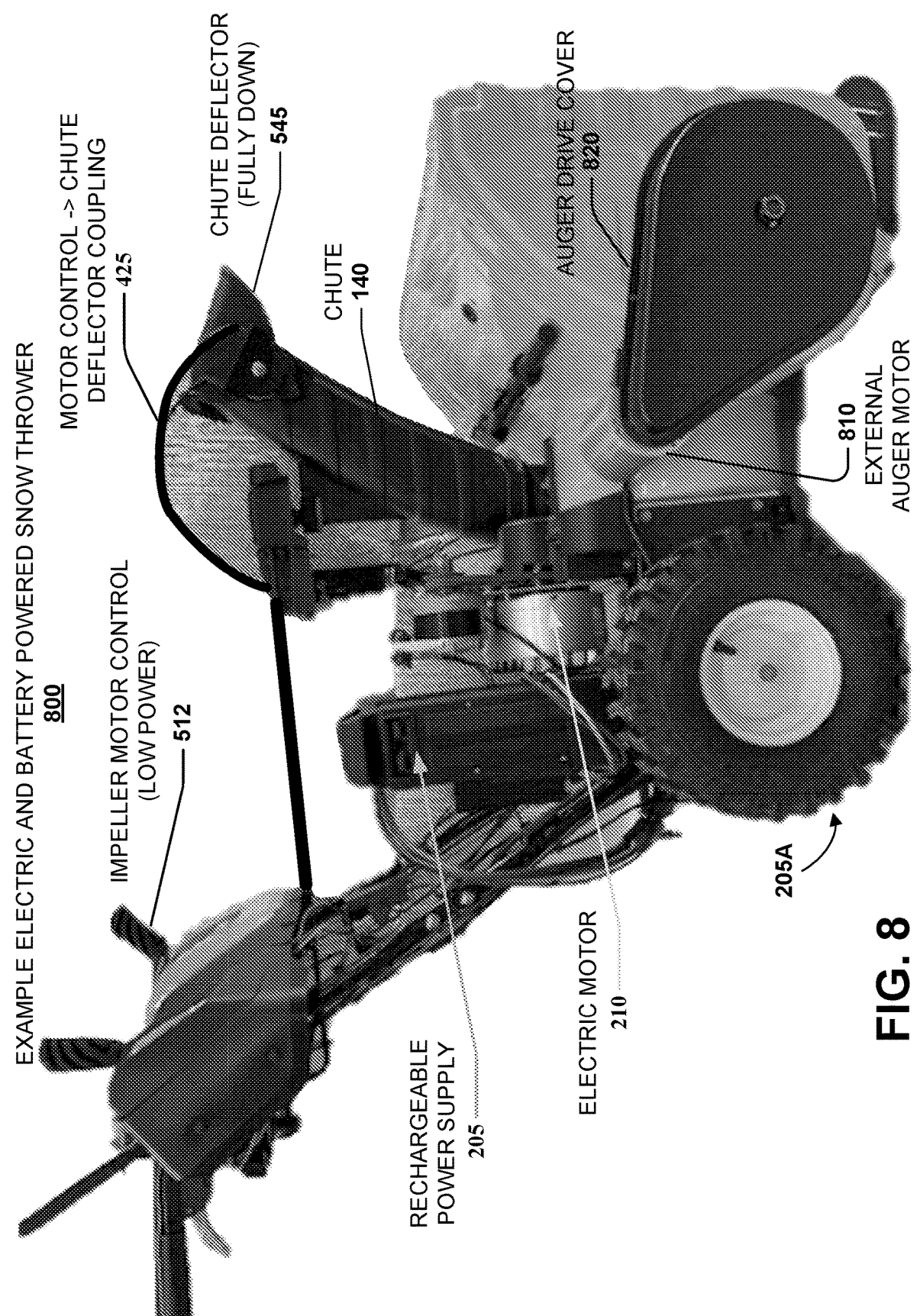
FIG. 8 illustrates an example electric-powered snow thrower apparatus with independent impeller and auger drive motors according to an embodiment(s).
Figure 8A:
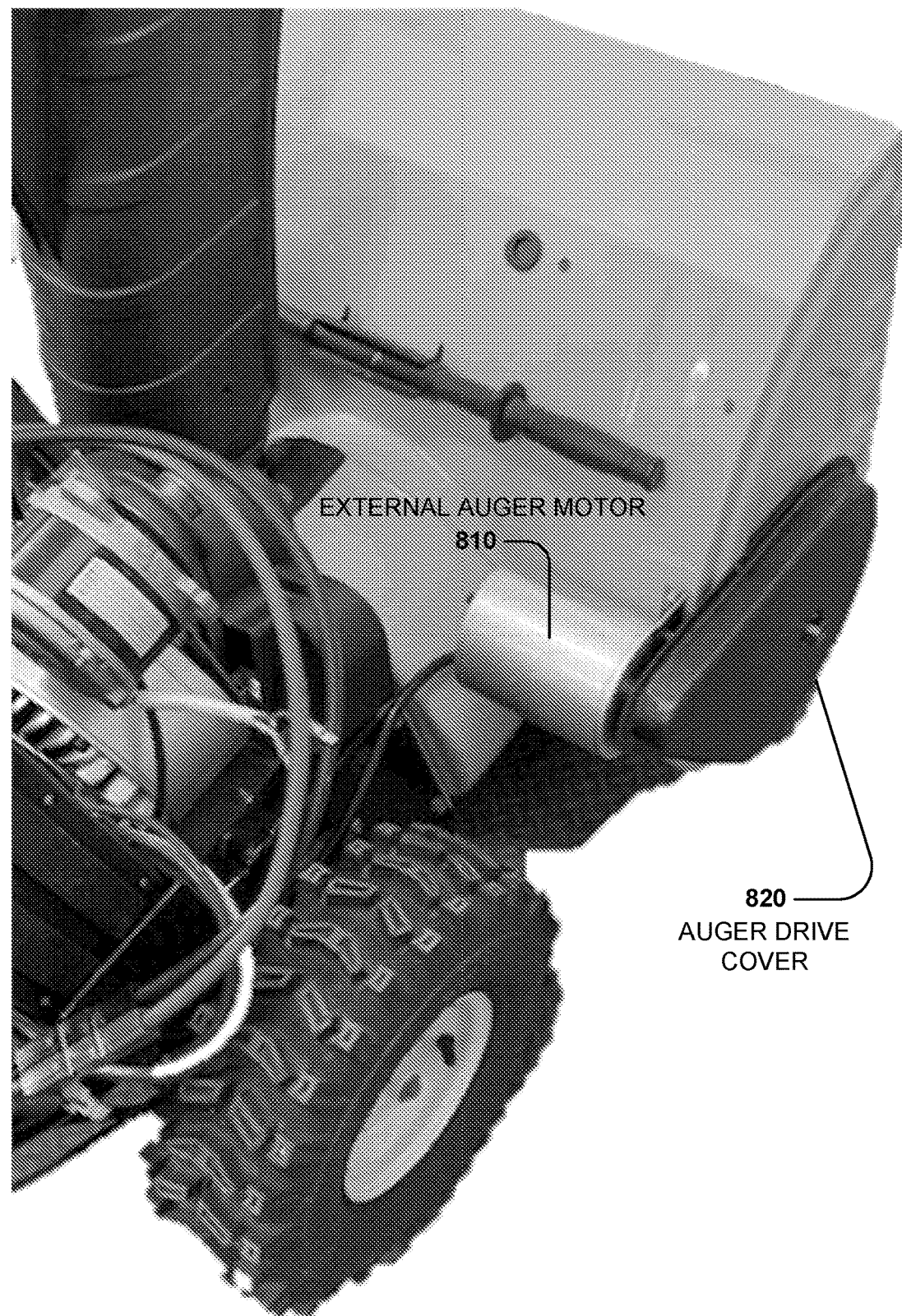
FIG. 8A depicts a top perspective of the example electric-powered snow thrower apparatus of FIG. 8, in additional embodiments.

FIG. 8 depicts a side view orientation of a HE snow thrower apparatus 800 according to various aspects of the disclosed embodiments. HE snow thrower apparatus 800 can be an electric powered snow thrower, having one or more electric motors—such as electric motor 210—powered by a rechargeable battery—such as rechargeable power supply 205. The electric motor(s) can output mechanical power to operate drive wheels (including right wheel 205A, as shown), operate a snow removal implement(s) (or a portion thereof) and optionally one or more other implements of disclosed HE snow thrower apparatuses (e.g., a boost-mode drive, a chute rotation drive, a chute deflector, etc.). Additionally, HE snow thrower apparatus 800 is shown with an impeller motor control 512 in low power position, and a chute deflector 545 in fully down orientation as implemented by motor control→chute deflector coupling 425 in response to impeller motor control 512.

In further aspects of the disclosed embodiments, HE snow thrower apparatus 800 can comprise an external auger motor 810 and auger motor drive (situated behind an auger drive cover 820) and outside of an auger housing of HE snow thrower apparatus 800. FIG. 8B also shows a rear-perspective view of HE snow thrower apparatus 800 depicting external auger motor 810 and auger drive cover 820. The external auger motor 810 receives electrical power from a power source (e.g., battery, generator, distributor, fixed power outlet, etc., such as rechargeable power supply 205) and outputs mechanical power to drive the auger drive powering the auger. External auger motor 810 and the auger drive can power actuation of an auger independent of power and actuation of an impeller. For instance, electric motor 210 can power the impeller by way of a drive train (e.g., drive train 315 of FIG. 3, supra) and external auger motor 810 can power the auger by way of the auger drive. This allows the impeller speed to be increased or decreased without affecting the auger drive speed. Moreover, a boost-mode can be implemented without affecting the auger drive speed, whether by increasing output speed of a motor drive coupled to electric motor 210 or by changing a drive/impeller coupling ratio, or the like, or a suitable combination of the foregoing. This can help to enhance performance and efficiency of HE snow thrower apparatus 800 by maintaining a constant auger speed when the impeller speed is increased or decreased to achieve a desired throw range, as described herein.

Figure 9:
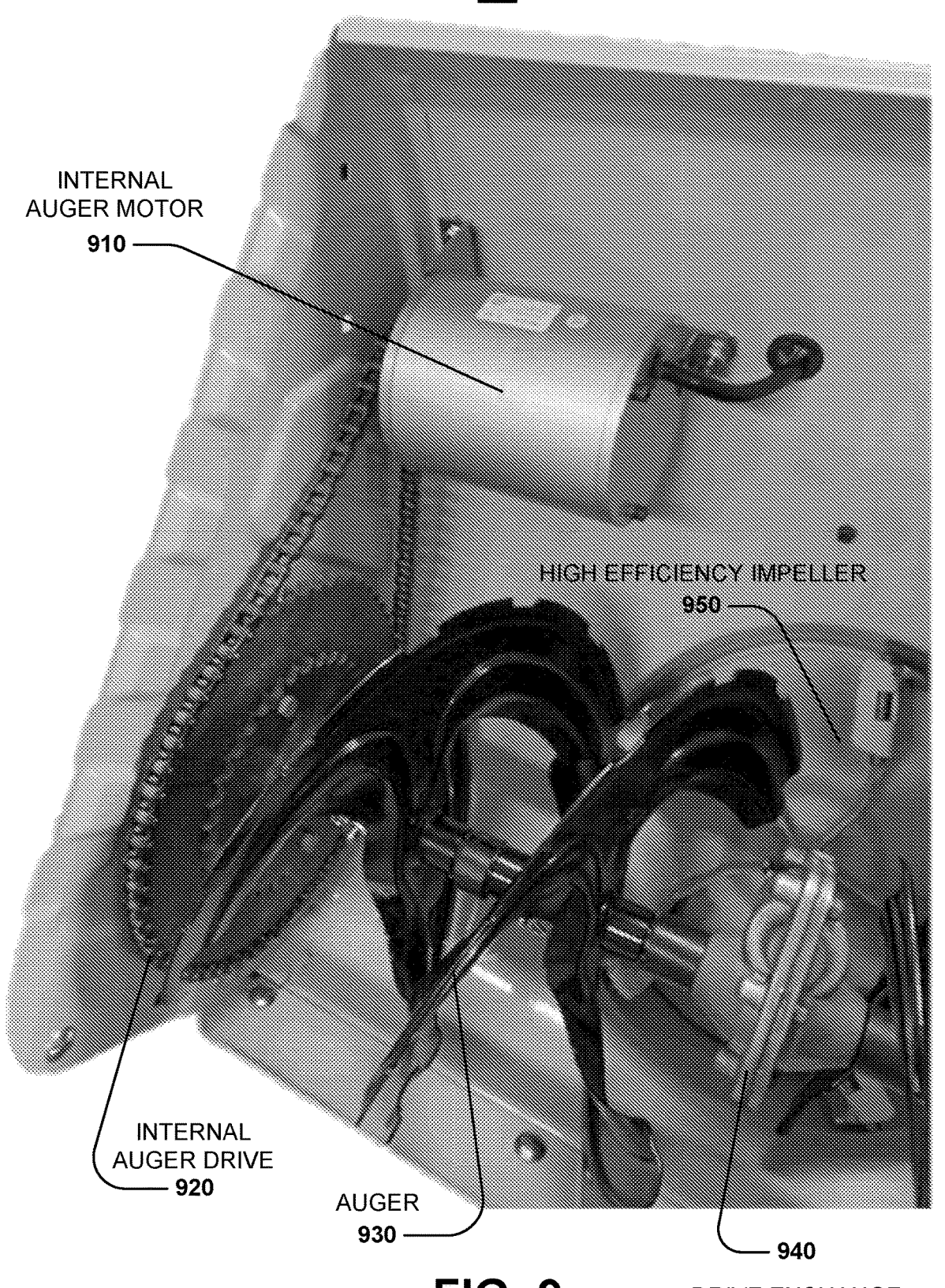
FIG. 9 depicts an interior of an auger housing of a snow thrower apparatus with internal independent auger motor and auger drive, in another aspect.

FIG. 9 illustrates an alternative aspect of disclosed embodiments of a HE snow thrower apparatus 900. HE snow thrower apparatus 900 includes an internal auger motor 910 that receives electrical power as an input and outputs mechanical power as an output. The mechanical power actuates an internal auger drive 920 mechanically coupled to an auger 930. A drive exchange 940 can be provided, in some aspects, to convey mechanical power from a left side of auger 930—physically connected to internal auger drive 920 (as oriented in the image of FIG. 9)—to a right side of auger 930. A high efficiency (HE) impeller 950 is shown behind drive exchange 940. In at least one alternative embodiment of the present disclosure, an impeller drive coupled to HE impeller 950 can also be integrated into drive exchange 940. In this embodiment, HE impeller 950 could be powered by the drive exchange 940 and internal auger motor 910. However, in other embodiments, drive exchange 940 is uncoupled from the impeller drive and the impeller drive is powered by a separate motor from internal auger motor 910, as described herein.

FIG. 10 illustrates a further aspect(s) of the present disclosure including an example impeller and auger drive train 1000. Impeller and auger drive train 1000 depicts an example in which an impeller drive 1055 and auger drive 1045 are mechanically coupled, and therefore can be powered by a common motor (or a common set of motors). A HE impeller 950 is shown secured to an impeller drive 1055. Between HE impeller 950 and auger drive 1045 is an optional 2nd stage auger 1060. Optional 2nd stage auger 1060 is configured to rotate together with HE impeller 950 and move snow from auger drive 1045 back toward an intake of HE impeller 950. Auger blades 1032 of auger 930 transfer snow from along a length of auger drive 1045 to a center thereof to be received by optional 2nd stage auger 1060.

A mechanical drive exchange 1042 transfers mechanical power from impeller drive 1055 to auger drive 1045. In one or more aspects, mechanical drive exchange 1042 can be configured to have a selected rotation coupling ratio between impeller drive 1055 and auger drive 1045, such that impeller drive 1055 rotates x times for each rotation of auger drive 1045. In an embodiment, the selected rotation coupling ratio can be a fixed ratio. The fixed ratio can be in a range of about 5 to about 7 rotations of impeller drive 1055 to one rotation of auger drive 1045, in a specific aspect (e.g., 5, 6 or 7 rotations to one, or any other suitable non-integer value or range there between). In another embodiment, the selected rotation coupling ratio can be variable, such as with a variable transmission coupling, or the like. In at least one embodiment, mechanical drive exchange 1042 can be embodied by impeller—auger drive exchange 1400 of FIGS. 14 and 14A (e.g., infra).

Figure 11:
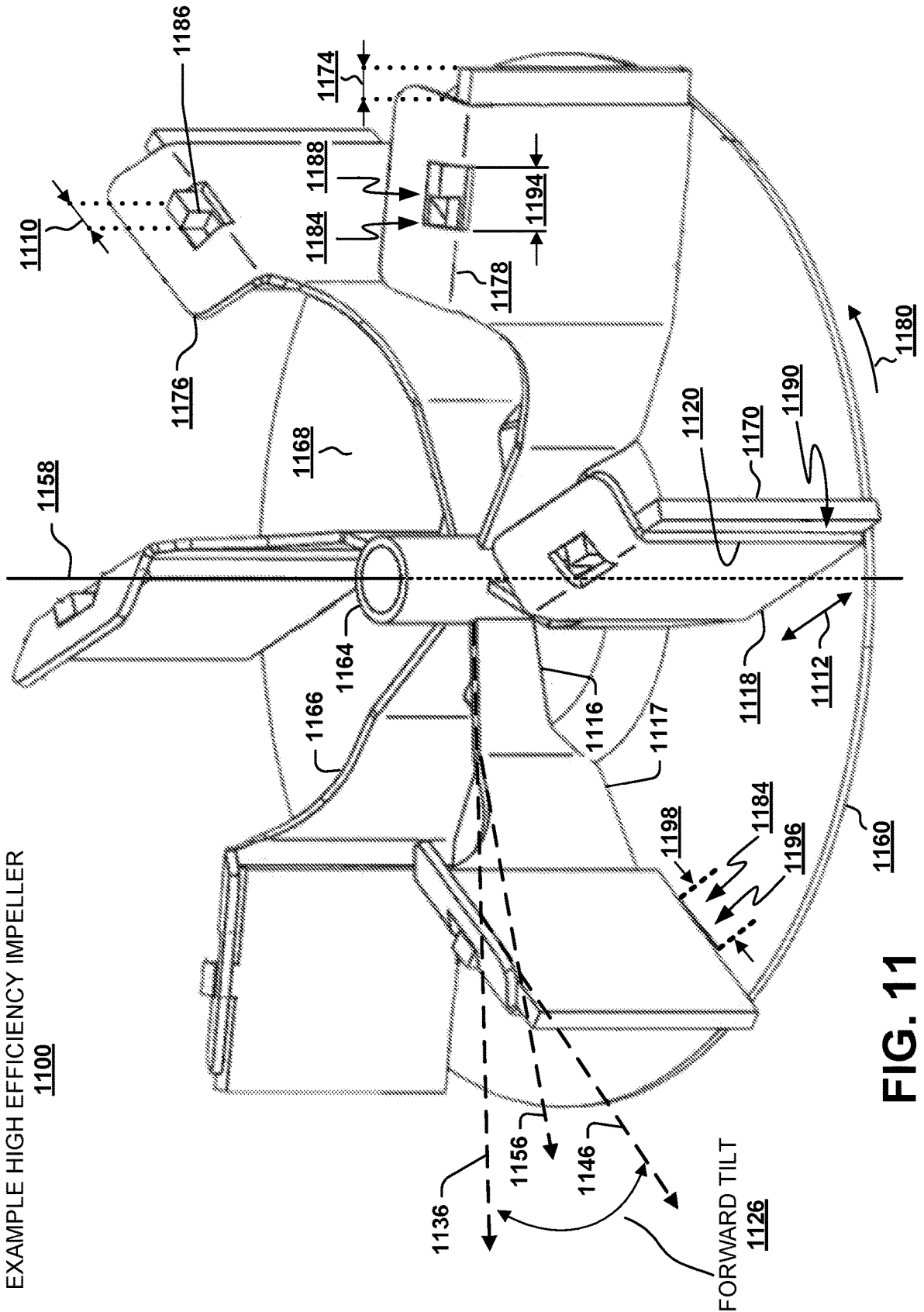
FIG. 11 depicts an example high efficiency impeller for a snow thrower apparatus of the present disclosure.

FIG. 11 illustrates an illustration of an example HE impeller 1100 according to additional embodiments of the present disclosure. HE impeller 1100 can be secured to a longitudinal drive shaft that rotates, causing HE impeller 1100 to rotate, within an impeller housing (e.g., impeller housing 220 of FIG. 2, supra) of a disclosed HE snow thrower apparatus. HE impeller 1100 rotates about a central axis (represented by axis 1158 of FIG. 11). HE impeller 1100 includes a hub 1164 located about the axis 1158 of rotation. Hub 1164 can provide a mounting surface for HE impeller 1100 to be mounted to the impeller drive shaft. As an example, HE impeller 1100 can be mounted to the impeller drive shaft by sliding hub 1164 over an outer surface of the impeller drive shaft and securing the hub 1164 on the outer surface of the impeller drive shaft utilizing an attachment mechanism (e.g., threaded bolt, nut-and-bolt, cotter pin, and so forth).

As illustrated, HE impeller 1100 includes a set of impeller blades, including an impeller blade 1166, extended from hub 1164 at respective first ends of the impeller blades 1166. The embodiment illustrated by FIG. 11 depicts six impeller blades 1166, though other numbers of impeller blades 1166 can be provided for HE impeller 1100 in alternative aspects of the present disclosure. In one embodiment, a single impeller blade 1166 can be provided; in other embodiments 3 or 4 impeller blades 1166 can be provided; in still further embodiments 5 or 6 impeller blades 1166 can be provided; in even other embodiments more than 6 impeller blades 1166 can be provided. Larger numbers of impeller blades 1166 can increase efficiency of HE impeller 1160 by reducing average time snow and ice will spend within an impeller housing in which HE impeller 1160 is positioned.

An optional back plate 1168 can be included as part of HE impeller 1100. Hub 1164 can be attached to back plate 1168 when included and located about the axis 1158 of rotation. Where back plate 1168 is provided, an impeller blade(s) 1166 can be connected to hub 1164 indirectly through back plate 1168 while not contacting hub 1164 directly, as one optional implementation. However, the subject disclosure is not so limited, and in other implementations impeller blade (s) 1166 directly connects to hub 1164 near a junction of back plate 1168 and hub 1164.

As depicted in FIG. 11, the impeller blades 1166 extend outward from hub 1164 to a perimeter or outer circumference 1160 of HE impeller 1100 adjacent back plate 1168. One or more impeller blades 1166 (up to all of the impeller blades 1166) can comprise a wiper 1170 mounted adjacent a portion of the impeller blade 1166. Wiper 1170 can be composed of flexible, resilient material such as a rubber compound, though the subject disclosure is not limited to such composition, and plastic compounds, fabric compounds, composite rubber-plastic, rubber-fabric, plastic-fabric, rubber-plastic-fabric, or other suitable composites, metal materials, or a suitable combination of the foregoing can be utilized for wiper 1170. As a non-limiting but illustrative example, a wiper 1170 can be composed of a rubber material including a fabric layer embedded within, sandwiched between, and so forth, the rubber compound or sub-layers thereof. In this example, the fabric layer can serve as reinforcement for the wiper structure, but it should be understood that other materials such as plastic materials, metal materials, compositions of the foregoing, or the like, can serve as reinforcement for the wiper structure, either embedded within, or providing a structure of framework there for, or the like. In general, however, it should be understood that any number of flexible, resilient materials known in the art or reasonably conveyed to one of ordinary skill in the art by way of the context of the present disclosure can be used to form wiper 1170 and are considered within the scope of the present disclosure.

In one or more disclosed aspects, wiper 1170 can be configured to be deformable upon pressure from an original shape and return to the original shape (or substantially the original shape) upon removal of the pressure. As a result, wiper 1170 can be deformed such that a wiper portion 1186 can be seated within a mounting slot 1184 defined within the portion of the impeller blade 1166 adjacent to wiper 1170 or defined within back plate 1168 (or a combination of the foregoing) to mount wiper 1170 to impeller blade 1166. In such aspects, wiper 1170 can be mounted without fasteners or tools; an operator can simply apply pressure (e.g., squeeze, etc.) the wiper 1170 to insert wiper portions 1186 into mounting slot(s) 1184 on impeller blade 1166, back plate 1168, or the like, and release the pressure to enable wiper 1170 to resume its original shape such that the mounting portions 1186 restrain wiper 1170 along a surface of impeller blade 1166 as shown.

Wiper 1170 can move outward along a surface of impeller blade 1166 within a range of motion permitted by mounting slot(s) 1184. Wiper 1170 can contact an interior wall (not depicted) of an impeller housing during rotational operation of HE impeller 1100, thereby reducing or eliminating a gap 1174 between a second end of impeller blade 1166 near perimeter 1160 of HE impeller and the interior wall of the impeller housing. Reduction or elimination of the gap 1174 can lead to several benefits. For example, minimizing the gap 1174 can lessen or eliminate material such as snow, ice, etc. from accumulating in the annular space created by gap 1174, thereby reducing or eliminating recirculation of the material to be ejected by HE impeller 1100 from a disclosed snow thrower apparatus. This leads to greater efficiency for the snow thrower. Additionally, reduction or elimination of gap 1174 can lead to increased material throw distances for snow thrower, achieving increased performance.

FIG. 11 shows wiper 1170 in the radially outward-most position permitted by mounting slot(s) 1184. Wiper 1170 can also move inward of the outward-most position, to an inward-most position as permitted by mounting slot(s) 1184. Of course, the wiper 1170 and HE impeller 1100 can operate properly at any suitable wiper position along the continuum between the inward-most and outward-most radial positions defined by the mounting slot(s) 1184.

As introduced above, HE impeller 1100 can define a mounting slot 1184 within a portion of impeller blade 1166—shown as having an upper mounting slot length 1194—or within portion of back plate 1168 adjacent an impeller blade 1166—shown having a lower mounting slot length 1198. In different aspects of the disclosed embodiments, mounting slot length 1194 can be of the same length or a different length as mount slot length 1198. In some aspects, impeller blade 1166 can define an upper blade extension 1176 at an edge of the portion of impeller blade 1166 adjacent wiper 1170. In one embodiment, the upper blade extension 1176 can define an upper mounting slot 1188 (which can be one example of mounting slot(s) 1184) on a leading face side 1190 of an impeller blade 1166. Upper mounting slot 1188 can be orientated radially, or substantially radially orientation, such that rotation of HE impeller 1100 about axis 1158 of rotation results in a centrifugal effect causing movement of wiper 1170 within upper mounting slot 1188 toward an outward-most position thereof. As illustrated, upper mounting slot 1188 can include upper mounting slot length 1194.

Back plate 1168 can define a lower mounting slot 1196, as mentioned, generally on an opposing side of wiper 1170 from upper mounting slot 1188 defined by upper blade extension 1176. Lower mounting slot 1196 can define lower mounting slot length 1198, which can be substantially equal to upper mounting slot length 1194 in one or more embodiments. A wiper portion 1186 can slide into a mounting slot(s) 1184 to mount wiper 1170 adjacent to the impeller blade 1166. In this embodiment, wiper 1170 is located on a leading face side 1190 of the impeller blade 1166, and can be supported by the impeller blade 1166 as it rotates and remains in contact with (or "wipes") the interior wall of the impeller housing. In this aspect of disclosed embodiments, wiper 1170 can be the same width or substantially the same width as impeller blade 1166, as measured in an axial direction.

To accommodate movement of wiper 1170 within mounting slot(s) 1184, upper mounting slot 1188 includes an upper mounting slot length 1194 and the wiper portion 1186 includes a first wiper length 1110. Upper mounting slot length 1194 is greater than the first wiper length 1110. Similarly, the lower mounting slot 1196 includes a low mounting slot length 1198 that is greater than first wiper length 1110. The greater lengths of mounting slots 1194, 1198 enable wiper 1170 to move in a direction 1112 away from hub 1164, enabling wiper 1170 to maintain contact with the interior wall of the impeller housing while remaining mounted to impeller blade 1166. For instance, with the ability of wiper 1170 to move in direction 1112 within mounting slots 1184, centrifugal effects of rotation of HE impeller 1100 can maintain an edge of wiper 1170 in contact with the interior wall of the impeller housing.

Enabling wiper 1170 to move in direction 1112 can benefit efficiency of HE impeller 1100 in multiple ways. As one example, rotation of HE impeller 1100 during normal operation can wear away material from an outer edge of wiper 1170 in contact with the interior wall of the impeller housing. As wiper 1170 wears, contact with the interior wall can be maintained as the wiper 1170 moves outward in direction 1112 to compensate for worn away wiper material from the outer edge of wiper 1170.

In another example, wiper 1170 is not statically fixed to impeller blade 1166, and can thus move in direction 1112 along an adjacent surface of impeller blade 1166. This enables the wiper 1170 to move in direction 1112 without requiring an operator to reposition and secure wiper 1170 manually along direction 1112 within mounting slot(s) 1184.

In yet another example, an interior wall surface of the impeller housing may include imperfections in cross-section, and may not be perfectly cylindrical. Even with potential inconsistencies in a radius of the interior wall, wiper 1170 can move outward as the radius increases and inward as the radius decreases, to maintain contact with the interior wall as HE impeller 1100 rotates. This maximizes the efficiency of HE impeller 1100 by maintaining contact with the interior wall of the impeller housing throughout a majority or entirety of a rotation arc of HE impeller 1100.

In a further embodiment, HE impeller 1100 can comprise an impeller blade 1166 that is substantially flat and straight, extending from hub 1164 to perimeter 1160 in a straight line, or substantially straight line. In another embodiment, an impeller blade 1166 can include a first blade portion 1116 and a second blade portion 1118. First blade portion 1116 can extend from hub 1164 along a first direction 1136 and second blade portion can extend from first direction 1136 at a forward tilt angle 1126 along a second direction 1146. Forward title angle 1126 can be a non-zero (and non-180 degree) angle, in these other embodiments, resulting in a "swept forward" orientation of second blade portion 1118 into an angle of rotation 1180 with respect to first blade portion 1116. In at least one further embodiment, impeller blade 1166 can have first blade portion 1116 and an intermediate blade portion 1117 that extends from first direction 1136 a third direction 1156 that is between first direction 1136 and second direction 1146. Further to the above, an alternative embodiment provides that second blade portion 1118 can be formed at a rearward tilt angle—not depicted—opposite that of forward tilt angle 1126 with respect to an angle of rotation 1180 of HE impeller 1100. In this embodiment, the second direction 1146 can be behind first direction 1136 as measured by angle of rotation 1180, also referred to as a "swept away" orientation of second blade portion 1118. In yet another embodiment, one or more impeller blades 1166 can have the "swept forward" orientation while one or more other impeller blades can have the "swept away" orientation.

In still other embodiments, impeller blade 1166 can be formed in a curvilinear fashion to define forward tilt angle 1126 from a first end of impeller blade 1166 near hub 1164 toward a second end near perimeter 1160. This curvilinear construction can be a smoothly varying (or substantially smoothly varying) angle along a length of impeller blade 1166 between hub 1164 and perimeter 1160, rather than segmented linear portions.

Figure 12:
FIG. 12 illustrates an example snow throw range for the high efficiency impeller of FIG. 11 with lower power consumption in a disclosed aspect.

FIG. 12 depicts an example snow throw range 1200 of a snow thrower apparatus utilizing HE impeller 1100 of FIG. 11, supra. On the right hand side is a picture of a snow thrower including HE impeller 1100, operating with a motor speed of about 2000 rpms. On the left is a picture of a snow thrower with a non-HE impeller operating with a motor speed of about 3500 rpms. Though the motor speed and power consumption are significantly higher for the snow thrower with the non-HE impeller, the snow throw distance is very similar. The snow throw distance for the non-HE impeller is about 22 feet (upper left picture), whereas the snow throw distance for the snow thrower apparatus with the HE impeller is about 21 feet (lower right picture), despite operating at more than forty percent reduced motor rotation speed. As a result, the snow thrower apparatus including HE impeller 1100 can achieve similar performance with significantly reduced motor speeds, or greatly improved performance at similar motor speeds.

FIG. 13 illustrates an example power management system 1300 operably coupled with a disclosed snow thrower apparatus according to one or more additional aspects of the present disclosure. Power management system 1300 can be configured to electrically and communicatively couple to one or more power sources of a snow thrower apparatus to control power intake by the power source(s), or control mechanical power output by the power source(s) to, in turn, control mechanical operation of one or more implements of a disclosed snow thrower apparatus.

As illustrated in FIG. 13, auger power control system 1320 can comprise auger motor 1324 and auger motor controller 1322 that can drive the auger motor 1324 to rotate auger(s) 1310. Similarly, impeller power control system 1340 can comprise impeller motor 1344 and impeller motor controller 1342 that can drive the impeller motor 1344 to rotate impeller 1330, and drive power control system 1360 can comprise drive motor(s) 1364 and drive motor controller(s) 1362 that can drive the drive motor(s) 1364 to rotate drive element(s) 1350. In some embodiments, one or more of auger motor controller 1322, impeller motor controller 1342 or drive motor controller(s) 1362 can be controlled based on a signal(s) received from one or more optional separate control units 1390 or via circuitry local to that power controller (1320, 1340, or 1360).

Although not specifically illustrated by FIG. 13, some aspects of the disclosed embodiments exist wherein two or more of auger(s) 1310, impeller 1330, and drive element(s) 1350 are driven by a first motor, and at least one of auger(s) 1310, impeller 1330, and drive element(s) 1350 are driven by a second motor distinct from the first motor (e.g., auger(s) 1310 and impeller 1330 can be driven by a first motor and drive element(s) 1350 can be driven by a second motor, etc.). An example is provided in FIG. 8, for instance, in which external auger motor 810 and an auger drive mechanically power an auger(s), and electric motor 210 and impeller drive powers an impeller and optionally wheels 205A, B. In other examples, however, external auger motor 810 can power an auger(s) and wheels 205A, B and electric motor 210 can drive the impeller, or other suitable combination.

In some aspects, power management system 1300 can establish a target power output(s) for one or more of auger motor 1324, impeller motor 1344 and drive motor(s) 1364 and manage auger motor controller 1322, impeller motor controller 1342 or drive motor(s) controller 1362 to achieve the target power output(s). In some aspects, a target power output(s) for one or more of: auger motor 1324, impeller motor 1344 and drive motor(s) 1364 can be established or modified at least in part by an operator implement control actuator associated with the auger motor 1324/impeller motor 1344/drive motor(s) 1364. Power management system 1300 can update a target power output(s) stored in memory (not depicted, but see FIG. 15, infra) for the auger motor 1324/impeller motor 1344/drive motor(s) 1364 and manage an associated auger motor controller 1322, impeller motor controller 1342 or drive motor(s) controller 1362 to achieve the updated target power output(s). As an illustrative example, an operator-driven impeller motor control (e.g., impeller motor control 412 of FIG. 4, supra) can establish a range of values associated by power management system 1300 with a range of target power output values for impeller motor controller 1342 to drive impeller motor 1344 and impeller 1330. A value of the range of values can be selected by position of the operator-driven impeller motor control, which can be received by power management system 1300 which then controls impeller motor controller 1342 to achieve the updated target power output for impeller motor 1344 and impeller 1330. In another example, a boost-mode actuator can change a prior impeller power output value (e.g., established by impeller motor control 412) to a boost-mode impeller power output value that is received by power management system 1300. Power management system 1300 can control impeller motor controller 1342 to cause impeller motor 1344 to meet the boost-mode impeller power output value. Upon de-activation of the boost-mode actuator, the prior impeller power output value can be restored by power management system 1300 causing impeller motor 1344 to meet the prior impeller power output value.

In further embodiments of the present disclosure, power management system 1300 can include load sensor devices (not depicted) configured to measure and monitor a load measurement at auger(s) 1310, impeller 1330 and drive element(s) 1350, and provide respective load measurements to power management system 1300. Load sensor devices can be located at respective motor controllers (1322, 1342, 1362), respective motors (1324, 1344, 1364) or respective implements (auger(s) 1310, impeller 1330, drive element(s) 1350), a suitable combination of the foregoing, or other suitable location(s) on disclosed snow thrower apparatuses. Power management system 1300 can receive load measurements and control respective motor controllers (1322, 1342, 1362) to achieve predetermined motor output performances stored in memory in response to the load measurements. In one example, predetermined motor output performances can cause power management system 1300 to maintain constant power output by auger(s) motor 1324, impeller motor 1344 or drive element(s) motor 1364 in response to changing load on auger(s) 1310, impeller 1330 or drive element(s) 1350. In a further example, power can be shifted between augur(s) 1310, impeller 1330 or drive element(s) 1350 to increase power to the implement(s) measuring higher load(s) at an associated load sensor. In some aspects, target power levels for the auger(s) 1310, impeller 1330, and drive element(s) 1350 can be determined based on measured loads on the auger(s) 1310, impeller 1330 and drive element(s) 1350. In such embodiments, load values for auger(s) 1310, impeller 1330 and drive element(s) 1350 can be mapped by a function (e.g., implemented by control unit 1390, motor controllers 1322, 1342, 1362, or a combination thereof) to power values for auger(s) 1310 impeller 1330, and drive element(s) 1350 (to be applied by auger power control system 1320, impeller power control system 1340, and drive power control system (s) 1360). In various embodiments, one or more load metric values can be prioritized over others for determining power control for auger(s) 1310, impeller 1330 or drive element(s) 1350, or can be prioritized when an associated load value(s) is within a given range of values. As an illustrative example, while the load on impeller 1330 is within a given range, the snow thrower can maintain or increase speed of drive element(s) 1350 until the load on impeller 1330 exceeds an upper bound of the given range, at which point, power to impeller 1330 can be increased, and power to auger(s) 1310 or drive element(s) 1350 can also change as defined by a load control algorithm operated by power management system 1300. In alternative aspects of the disclosed embodiments, similar output controls can be instituted based on the load on auger(s) 1310 (where increased load beyond a given range can trigger power increasing at impeller 1330 or auger(s) 1310, power optionally decreasing at drive element (s) 1350, or other suitable relative load relationship) or drive element(s) 1350 (e.g., where increased load can be indicative of load potentially about to increase on other implements).

Various illustrative example scenarios and embodiments are provided hereinbelow pertaining to motor output control policies in response to load metric inputs for a control algorithm operated by power management system 1300. It should be appreciated that other embodiments can manage power (e.g., increasing, decreasing or maintaining constant) for auger(s) 1310, impeller 1330 or drive element(s) 1350 differently than provided in the following examples. In various embodiments, power changes in response to an increased or decreased load can be in response to any change in load, change above or below value(s) (e.g., nominal value(s), value(s) associated with optimal operation, etc.), change greater than a threshold amount, etc.

In a first example, an increased load on auger(s) 110 can trigger auger power control system 1320 to increase power to auger(s) 1310 (e.g., for increases in load on auger(s) 1310 within a range capable of impeller 1330 and auger(s) 1310 maintaining efficient snow removal, etc.). As a second example, increased load on auger(s) 1310 can trigger auger power control system 1320 to increase power to auger(s) 1310 or can trigger impeller control system 1340 to increase power to impeller 1330, or a suitable combination of the foregoing. In yet another example, increased load on auger (s) 1310 can trigger drive power control system 1360 to decrease power to drive element(s) 1350. In some such embodiments, power to drive element(s) 1350 can remain constant when load on auger(s) 1310 increases, unless total power used by power management system 1300 is equal to or greater than a threshold total power consumption value. Increased load on auger(s) 1310 can be presumed to result from increased snow, or increased weight or mass of snow, entering an auger housing. In response to such a condition, increasing power to auger(s) 1310 or increasing power to impeller 1330 can enable a snow thrower apparatus disclosed herein to maintain snow removal performance suitable for the increased snow or increased weight or mass of snow. Additionally, the increased load on auger(s) 1310— optionally when exceeding a total power threshold—can justify reducing the amount of snow entering the auger housing, achieved by reducing power to drive element(s) 1350.

In still other aspects of the disclosed embodiments, reduced load on auger(s) 1310 can trigger auger power control system 1320 to decrease power to auger(s) 1310 or trigger impeller power control system 1340 to decrease power to impeller 1330. Decreased power can be within a range down to a predetermined lower power limit associated with operating a disclosed snow thrower apparatus. In at least one embodiment, reduced load on auger(s) 1310 can trigger drive power control system 1360 to increase power to drive element(s) 1350 (e.g., up to a preset or operator-selected drive element(s) power, or until a target ground speed is achieved, for instance, to achieve an operator-selected ground speed, and so forth).

In further examples, in response to an increased load on impeller 1330, impeller power control system 1340 can increase power to impeller 1330. Optionally, in response to an increased load on impeller 1330, auger power control system 1320 can decrease power to auger(s) 1310 (slowing the transfer of material to impeller 1330). As another option, in response to an increased load on impeller 1330, drive power control system(s) 1360 can decrease power to drive element(s) 1350 (which can also slow transfer of material to impeller 1330). In at least one aspect, drive power control system(s) 1360 can decrease power to drive element(s) 1350 when both an increased load on impeller 1330 is measured and an increased load on auger(s) 1310 is measured.

In alternative aspects, a reduced load on impeller 1330 can trigger auger power control system 1320 to decrease power to auger(s) 1310 or trigger impeller power control system 1340 to decrease power to impeller 1330 (e.g., down to baseline level(s) associated with a low power consumption operation, or the like). As another option, reduced load on impeller 1330 can trigger auger power control system 1320 to maintain or increase power to auger(s) 1310, which can thereby increase the load on impeller 1330. In at least one disclosed aspect, reduced load on impeller 1330 can trigger drive power control system 1360 to increase power to drive element(s) 1350 (e.g., up to a predetermined or operator-selected level, or until a target ground speed is achieved, for example, to achieve an operator-selected ground speed, and the like).

In a further aspect, increased load on drive element(s) 1350 can result from scenarios such as pushing the snow thrower through thicker snow, movement uphill, or the like. Increased load on only one drive element 1350 of two or more can result from uneven snow or surface conditions between the drive element(s) 1350. In various disclosed aspects, increased load on drive element(s) 1350 can trigger drive power control system(s) 1360 increase power to drive element(s) 1350 (e.g., to try to maintain a target ground speed). In some embodiments, power to drive element(s) 1350 can be increased subject to load on auger(s) 1310 or impeller 1330 being below a threshold load metric associated with increased drive element(s) power.

In still further aspects, reduced load on drive element(s) 1350 can trigger drive power control system(s) 1360 to reduce power to drive element(s) 1350. In response to reduced load on drive element(s) 1350 below a baseline level (e.g., indicative of loss of traction) drive power control system(s) 1360 can reduce power to drive element(s) 1350; auger power control system 1320 can increase power to auger(s) 1310; or impeller power control system 1340 can increase power to impeller 1330, or a suitable combination of the foregoing.

Various embodiments can prioritize power at one or more of auger(s) 1310, impeller 1330, or drive element(s) 1350, in situations in which power might be reduced. In many situations, the impeller 1330 can be a chokepoint, and prioritizing impeller 1330 to maintain the ability of impeller 1330 to clear snow can maintain efficient snow clearing in situations involving higher loads. As another example, embodiments can attempt to maintain a target ground speed via power to drive element(s) 1350 regardless of load on the auger(s) 1310 or impeller 1330, and only reduce power to drive element(s) 1350 when increasing power to auger(s) 1310 or impeller 1330 is no longer possible (e.g., the combination has reached a maximum power level, despite load inputs being associated by an algorithm with increased power to auger(s) 110 or impeller 130, etc.). Additionally, or alternatively, total power can be conserved by managing power at auger(s) 1310, impeller 1330, or drive element(s) 1350 to be at or near a minimum power consumption sufficient for current operating conditions (e.g., or current operating conditions at the target ground speed, etc.).

FIGS. 14 and 14A illustrate an example impeller—auger drive exchange 1400 for a snow thrower apparatus according to alternative or additional aspects of the disclosed embodiments. Impeller—auger drive exchange 1400 can be implemented for a snow thrower apparatus in which a single motor (or set of motors) drive both an impeller (e.g., HE impeller 950 of FIG. 9, supra) and an auger (e.g., auger 930). A motor (e.g., electric motor 210) can be mechanically coupled to an impeller drive 1414 that is coupled with impeller drive shaft 1410. In an aspect(s) of the disclosed embodiments, the mechanical coupling can be the same or similar to that depicted in FIG. 3, in which motor 310 outputs mechanical power at a motor drive 320, which mechanical power is transferred to an impeller pulley by way of motor pulley 325, impeller clutch 340 and drive belt 330. In this aspect(s), impeller drive shaft 1410 can be coupled to impeller pulley to receive the mechanical power that rotates impeller drive shaft 1410. The subject disclosure is not so limited however, and other mechanical transfer devices such as various gears or gearing structures—including fixed gear ratio gearing structures, continuously variable gearing structures or discretely variable gearing structures—ratcheting structures, pulley structures, disc, roller or toroidal structures, chain-driven or belt-driven structures, hydrostatic transmissions, hydraulic transmissions, pneumatic transmissions, and so forth, can be utilized to transfer mechanical power from the motor to impeller drive 1414 in various other aspects of the disclosed embodiments.

Impeller drive shaft 1410 can be fixedly secured to an impeller (not depicted), such that rotation of impeller drive shaft 1410 also rotates the impeller. Additionally, impeller drive shaft 1410 is input into drive exchange housing 1420 and defines a gearing structure identified as impeller drive gear 1422 in FIG. 14. In some disclosed aspects, impeller drive shaft 1410 can be a separate structure that is physically secured to impeller drive gear 1422 by one or more fastening means (e.g., set screw(s), threaded bolt(s), nut(s)-and-bolt (s), coupling rod(s), compression pin(s), heat weld point(s), and so forth), whereas in other aspects impeller drive gear 1422 can be integrally formed into impeller drive shaft 1410 as a single structure that defines both impeller drive shaft 1410 and impeller drive gear 1422. In an embodiment, impeller drive gear 1422 can be a worm drive, through other types of gears or gearing structures can be utilized as alternatives.

Impeller drive gear physically interfaces with an auger drive gear 1424 defined as part of an auger drive shaft 1430.

The physical interface of impeller drive gear 1422 and auger drive gear 1424 results in rotation of a second of either: the auger drive gear 1424 and impeller drive gear 1422 in response to rotation of a first of either: the auger drive gear 1424 and impeller drive gear 1422. Thus, rotation of impeller drive gear 1422 causes rotation of auger drive gear 1424, and rotation of auger drive gear 1424 causes rotation of impeller drive gear 1422. Moreover, the rotation of impeller drive gear 1422 and auger drive gear 1424 can have a fixed coupling ratio such that rotation of impeller drive gear 1422 is associated with one, less than one, or more than one rotation of auger drive gear 1424. In some disclosed aspects, the fixed coupling ratio can be selected in a range of about 5 rotations to about 7 rotations of impeller drive gear 1422 to about one rotation of auger drive gear 1424. Note that the fixed coupling ratio need not be a ratio of integer numbers, as non-integer values can define the fixed coupling ratio as well. For instance, 6.1 to 1.1 ratio, 5.7 to 1.0 ratio, 7.2 to 0.9 ratio, and other non-integer coupling ratios in a range from about 5 to about 7 to one are contemplated by such disclosed aspects. Moreover, the fixed coupling ratio is not limited to two significant digits, and ratios of three significant digits (e.g., 5.50:1, 6.02:1, etc.), four significant digits (e.g., 5.667: 1, 6.252:1, 7.010:1, and so forth), as well as larger numbers of significant digits can be utilized, depending on implementation. Of course, the fixed coupling ratio can indeed be an integer coupling ratio: 5:1, 6:1, 7:1 etc. are also contemplated by the fixed coupling ratio in these disclosed aspects.

Similar to impeller drive gear 1422 and impeller drive shaft 1410, above, auger drive gear 1424 and auger drive shaft 1430 can be separate structures physically secured together by one or more fastening means (e.g., as described above for impeller drive shaft 1410 and impeller drive gear 1422) or can be integrally formed as a single structure that defines both auger drive shaft 1430 and auger drive gear 1424. Drive exchange housing 1420 can be constructed of a suitable rigid material that can accommodate mechanical stresses generated by driving impeller drive shaft 1410 and transferring mechanical power to auger drive shaft 1430. Metal, metal alloy(s), metal mixtures or composites, high strength plastics or ceramics or other suitable materials of sufficient structural integrity can be utilized for drive exchange housing 1420 according to various aspects of the disclosed embodiments.

FIG. 14A illustrates a side-perspective view of impeller—auger drive exchange 1400 along an axis of auger drive shaft 1430. The side-perspective view illustrates the physical coupling of impeller drive gear 1422 and auger drive gear 1424 within drive exchange housing 1420. A perpendicular view of impeller drive shaft 1410 and its relationship with impeller drive shaft 1410 is also visible from the side-perspective view of FIG. 14A.

In connection with FIG. 15, the systems and processes described herein can be embodied within hardware, such as a single integrated circuit (IC) chip, multiple ICs, an application specific integrated circuit (ASIC), or the like. A suitable control unit 1500 for implementing various aspects of the claimed subject matter includes a computer 1502. In various embodiments, a control unit (e.g., control unit 1390, etc.) of a snow thrower can be embodied in part by computer 1502, or an analogous computing device known in the art, subsequently developed, or made known to one of ordinary skill in the art by way of the context provided herein.

The computer 1502 can include a processing unit 1504, a system memory 1510, a codec 1514, and a system bus 1508. The system bus 1508 couples system components including, but not limited to, the system memory 1510 to the processing unit 1504. The processing unit 1504 can be any of various available processors. Dual microprocessors and other multiprocessor architectures also can be employed as the processing unit 1504.

The system bus 1508 can be any of several types of bus structure(s) including the memory bus or memory controller, a peripheral bus or external bus, or a local bus using any variety of available bus architectures including, but not limited to, Controller Area Network (CAN), Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1510 can include volatile memory 1510A, non-volatile memory 1510B, or both. Operating instructions of a control unit (among other control units: 1390, etc., depicted herein) described in the present specification can be loaded into system memory 1510, in various embodiments, upon startup of computer 1502. The basic input/output system (BIOS), containing the basic routines to transfer information between elements within the computer 1502, such as during start-up, is stored in non-volatile memory 1510B. In addition, according to present innovations, codec 1514 may include at least one of an encoder or decoder, wherein the at least one of the encoder or decoder may consist of hardware, software, or a combination of hardware and software. Although, codec 1514 is depicted as a separate component, codec 1514 may be contained within non-volatile memory 1510B. By way of illustration, and not limitation, non-volatile memory 1510B can include read only memory (ROM), programmable ROM (PROM), electrically programmable ROM (EPROM), electrically erasable programmable ROM (EEPROM), or Flash memory. Non-volatile memory 1510B can be embedded memory (e.g., physically integrated with computer 1502 or a mainboard thereof), or removable memory. Examples of suitable removable memory can include a secure digital (SD) card, a compact Flash (CF) card, a universal serial bus (USB) memory stick, or the like. Volatile memory 1510A includes random access memory (RAM), which can serve as operational system memory for applications executed by processing unit 1504. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM), and so forth.

Computer 1502 may also include removable/non-removable, volatile/non-volatile computer storage medium. FIG. 15 illustrates, for example, disk storage 1506. Disk storage 1506 includes, but is not limited to, devices such as a magnetic disk drive, solid state disk (SSD) floppy disk drive, tape drive, Flash memory card, memory stick, or the like. In addition, disk storage 1506 can include storage medium separately or in combination with other storage medium including, but not limited to, an optical disk drive such as a compact disk ROM device (CD-ROM) or derivative technology (e.g., CD-R Drive, CD-RW Drive, DVD-ROM, and so forth). To facilitate connection of the disk storage 1506 to the system bus 1508, a removable or non-removable interface is typically used, such as interface 1512. In one or more embodiments, disk storage 1506 can be limited to solid state non-volatile storage memory, providing motion and vibration resistance for a control unit (e.g., control unit 280, among others) operable in conjunction with a snow thrower (e.g., snow thrower etc.).

It is to be appreciated that FIG. 15 describes software stored at non-volatile computer storage media (e.g., disk storage 1506) utilized to operate a disclosed control unit 1500 to manage power between two or more of an auger, impeller, or drive element(s) of a disclosed snow thrower (e.g., snow throwers 100, 200, 300, 400, 500, 600, 800, 900 disclosed hereinabove). Such software includes an operating system 1506A. Operating system 1506A, which can be stored on disk storage 1506, acts to control and allocate resources of the computer 1502. Applications 1506C take advantage of the management of resources by operating system 1506A through program modules 1506D, and program data 1506B, such as the boot/shutdown transaction table and the like, stored either in system memory 1510 or on disk storage 1506. It is to be appreciated that the claimed subject matter can be implemented with various operating systems or combinations of operating systems.

Input device(s) 1542 connects to the processing unit 1504 and facilitates user interaction with control unit 1500 through the system bus 1508 via interface port(s) 1530. Input port(s) 1540 can include, for example, a serial port, a parallel port, a game port, a universal serial bus (USB), among others. Output device(s) 1532 use some of the same type of ports as input device(s) 1542. Thus, for example, a USB port may be used to provide input to computer 1502 and to output information from computer 1502 to an output device 1532. Output adapter 1530 is provided to illustrate that there are some output devices, such as graphic display, speakers, and printers, among other output devices, which require special adapters. The output adapter 1530 can include, by way of illustration and not limitation, video and sound cards that provide a means of connection between the output device 1532 and the system bus 1508. It should be noted that other devices or systems of devices provide both input and output capabilities such as remote computer(s) 1524 and memory storage 1526.

Computer 1502 can operate in conjunction with one or more electronic devices described herein. For instance, computer 1502 can facilitate power management between two or more of an auger, impeller, or drive element(s), within a power management system 1300 of a disclosed snow thrower apparatus, as described herein. Additionally, computer 1502 can communicatively couple with auger motor controller 1322, impeller motor controller 1342, or drive motor controller(s) 1362 to manage power for auger(s) 1310, impeller 1330, or drive element(s) 1350, respectively, according to one or more aspects discussed herein.

Communication connection(s) 1520 refers to the hardware/software employed to connect the network interface 1522 to the system bus 1508. While communication connection 1520 is shown for illustrative clarity inside computer 1502, it can also be external to computer 1502. The hardware/software necessary for connection to the network interface 1522 includes, for exemplary purposes only, internal and external technologies such as, modems including regular telephone grade modems, cable modems and DSL modems, ISDN adapters, and wired and wireless Ethernet cards, hubs, and routers.

In regard to the various functions performed by the above described components, machines, devices, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as electronic hardware configured to implement the functions, or a computer-readable medium having computer-executable instructions for performing the acts or events of the various processes.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In other embodiments, combinations or sub-combinations of the above disclosed embodiments can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present disclosure.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A snow thrower, comprising:
a drive element configured to move the snow thrower on a surface;
an auger housing and an auger positioned within the auger housing for moving material within the auger housing toward an output of the auger housing;
an impeller housing coupled to the auger housing and having an intake through which the material is received at the impeller housing from the output of the auger housing;
an impeller configured to receive the material at the intake of the impeller housing and expel the material from the impeller housing by way of a chute coupled to the impeller housing, the impeller comprising:
a blade arm extending from a first end near a center of rotation of the impeller to a second end near a perimeter of the impeller and having a blade arm length and defining a blade arm surface, and
a wiper positioned adjacent to the blade arm surface and that is movable a predefined distance beyond the blade arm length of the blade arm and in a direction substantially parallel to the blade arm surface;
a power system comprising:

an electric motor that generates mechanical power as an output and receives electrical power as an input, and
a distribution system configured to transfer a portion of the mechanical power to rotate the impeller within the impeller housing to facilitate expelling the material from the impeller housing by way of the chute; and
a boost mode actuator configured to increase a magnitude of the mechanical power generated by the electric motor or configured to increase the portion of the mechanical power transferred by the distribution system to rotate the impeller from an operating mode to a boosted mode in response to actuation of the boost mode actuator, and is further configured to return the magnitude of the mechanical power generated or the portion of the mechanical power transferred to the operating mode from the boosted mode in response to de-actuation of the boost mode actuator.

2. The snow thrower of claim 1, further comprising a second electric motor that generates second mechanical power distributed to at least one of: rotate the auger within the auger housing or operate the drive element to move the snow thrower on the surface, wherein the second electric motor is independent of the electric motor.

3. The snow thrower of claim 1, further comprising a second electric motor that generates second mechanical power distributed to rotate the auger within the auger housing and a third electric motor that generates third mechanical power distributed to operate the drive element to move the snow thrower on the surface.

4. The snow thrower of claim 1, wherein the distribution system transfers a second portion of the mechanical power to rotate the auger within the auger housing.

5. The snow thrower of claim 4, wherein the distribution system includes a mechanical drive exchange configured to rotate the impeller a first number, x, of rotations for each second number, n, of rotations of the auger, wherein x is selected from a range of about five to about seven and n is one.

6. The snow thrower of claim 1, further comprising an impeller motor control input configured to modify a magnitude of the electrical power consumed by the electric motor and the magnitude of the mechanical power generated by the electric motor within a range extending from a low power magnitude to a high power magnitude.

7. The snow thrower of claim 6, wherein:
the low power magnitude corresponds to a motor drive rotation per minute (rpm) of the electric motor within a first range from about 1000 rpm to about 1400 rpm and corresponds to an electrical power consumption of the electric motor in a first power range from about 0.5 kilowatts (kW) to about 0.7 kW; and
the high power magnitude corresponds to a motor drive rpm within a second range from about 1700 rpm to about 2300 rpm and corresponds to an electrical power consumption of the electric motor in a second power range from about 1 kW to about 1.5 kW.

8. The snow thrower of claim 1, wherein:
the mechanical power generated by the electric motor or the portion of the mechanical power transferred by the distribution system in the operating mode corresponds to a mechanical drive rpm within a first range from about 1700 rpm to about 2300 rpm and a throw range of the material from the chute of about 19 to about 23 feet; and
the mechanical power generated by the electric motor or the portion of the mechanical power transferred by the distribution system in the boosted mode corresponds to a mechanical drive rpm within a second range from about 3200 rpm to about 3800 rpm and a second throw range of the material from the chute of about 41 to about 49 feet in the boosted mode.

9. The snow thrower of claim 1, wherein the impeller comprises five blade arms or six blade arms spaced about the circumference of the impeller.

10. The snow thrower of claim 1, wherein one of:

the blade arm defines a forward tilt into a direction of rotation of the impeller within the impeller housing, such that the first end of the blade arm near the center of rotation of the impeller is displaced behind the second end of the blade arm near the perimeter of the impeller along a circumference of the impeller and in the direction of rotation; or the blade arm defines a forward tilt into a direction of rotation of the impeller within the impeller housing, such that a first segment of the blade arm near the center of rotation of the impeller is angled substantially perpendicular to the direction of rotation and a second portion of the blade arm near the perimeter of the impeller is angled forward of perpendicular to the direction of rotation by a non-zero angle.

11. The snow thrower of claim 1, wherein the wiper comprises a wiper portion that secures within a mounting slot at least in part defined by the portion of the blade arm, or defined by a back plate surface of the impeller, facilitating movement of the wiper up to the predefined distance beyond the blade arm length.

12. The snow thrower of claim 11, wherein the wiper portion secures within the mounting slot defined by the portion of the blade arm and wherein the wiper further comprises a second wiper portion that secures within a second mounting slot defined by the back plate surface of the impeller, wherein translation of the wiper portion and the second wiper portion within the mounting slot and the second mounting slot, respectively, facilitate movement of the wiper up to the predefined distance.

13. The snow thrower of claim 1, wherein the wiper moves to the predefined distance beyond the blade arm length of the blade arm in response to rotation of the impeller, and wherein an edge of the wiper extends in part beyond the perimeter of the impeller when the wiper is moved to the predefined distance.

14. A snow thrower apparatus, comprising:

a frame;

a drive element secured to the frame and supporting the frame above a surface, wherein the drive element is configured to move the snow thrower apparatus with respect to the surface;

an impeller housing;

an impeller rotatably disposed within the impeller housing;

an auger housing adjacent the impeller housing;

an auger rotatably disposed within the auger housing;

an electric motor secured to the frame;

a power source electrically coupled to the electric motor to provide electric power to the electric motor;

a motor drive powered by an output of the electric motor and mechanically coupled at least to the impeller for rotating the impeller within the impeller housing;

an impeller controller configured to vary an impeller rotation speed of the impeller within a range defined by a low impeller speed at one end of the range and a high impeller speed at a second end of the range; and an impeller drive control input device configured to cause the impeller controller to vary the impeller speed between the range defined by the low impeller speed and the high impeller speed, wherein when positioned in the low impeller speed the motor drive has a mechanical rotation per minute (rpm) in a range from about 1000 rpm to about 1400 rpm and when positioned in the high impeller speed the motor drive has a second mechanical rpm in a second range from about 1700 rpm to about 2300 rpm.

15. The snow thrower apparatus of claim 14, wherein the impeller controller is configured to vary a mechanical power output by the electric motor and mechanical rpm of the motor drive to effect varying the impeller rotation speed between the low impeller speed and the high impeller speed.

16. The snow thrower apparatus of claim 14, wherein the impeller controller is configured to vary a mechanical coupling between the impeller and the motor drive that varies a relative rotation rate of the impeller compared to a rotation rate of the motor drive to effect varying the impeller rotation speed between the low impeller speed and the high impeller speed.

17. The snow thrower apparatus of claim 14, wherein the impeller controller is configured to vary a mechanical rpm of the motor drive and to vary a mechanical coupling that defines a relative rotation rate of the impeller compared to the motor drive to effect varying the impeller rotation speed between the low impeller speed and the high impeller speed.

18. The snow thrower apparatus of claim 14, wherein:

the impeller controller comprises a motor controller responsive to the impeller drive control input device and configured to vary an electrical power consumption of the electric motor from the power source and vary a mechanical power generated at the motor drive to facilitate varying the impeller rotation speed between the low impeller speed and the high impeller speed;

the motor controller is configured to vary the electrical power consumption between a low power consumption associated with the low impeller speed and a high power consumption associated with the high impeller speed; and the low power consumption is within a first range of about 0.5 kilowatts (kW) and about 0.7 kW, and wherein the high power consumption is within a second range of about 1.0 kW and about 1.5 kW.

19. The snow thrower apparatus of claim 14, further comprising:

a chute defining a path through which material expelled from the impeller housing in response to rotation of the impeller travels;

a chute deflector rotatably secured to a top portion of the chute and rotatable between a lowered position and a raised position defining at least in part a range of vertical angles through which the material exits the chute; and a motor control and chute deflector coupling that rotates the chute deflector to the lowered position in response to the impeller drive control input device causing the impeller controller to vary the impeller speed to the lower impeller speed and that rotates the chute deflector to the raised position in response to the impeller drive control input device causing the impeller controller to vary the impeller speed to the high impeller speed, wherein:

a low throw distance is associated with the low impeller speed and the lowered position of the chute deflector that is effective to expel snow from the impeller housing a distance of up to about eight to ten feet; and a high throw distance is associated with the high impeller speed and the raised position of the chute deflector that is effective to expel snow from the impeller housing a second distance of up to about twenty to twenty-three feet.

20. The snow thrower apparatus of claim 14, further comprising a boost mode actuator configured to cause the impeller speed to achieve a boosted high impeller speed when actuated, and return to the high impeller speed when not actuated, and wherein the boosted high impeller speed has a third mechanical rpm in a third range from about 3200 rpm to about 3800 rpm.

21. The snow thrower apparatus of claim 20, wherein:

a boosted power consumption associated with the boosted high impeller speed is within a power range of about 2.6 kW to about 3.0 kW;

a high power consumption associated with the high impeller speed is within a second power range of about 1.0 kW to about 1.5 kW;

in response to actuation of the boost mode actuator the power source increases electrical power provided to the electric motor from the high power consumption to the boosted power consumption; and in response to de-actuation of the boost mode actuator the power source decreases electrical power provided to the electric motor from the boosted power consumption to the high power consumption.

22. The snow thrower apparatus of claim 20, wherein a boosted throw distance is associated with the boosted high impeller speed that is effective to expel snow from the impeller housing a distance of up to about forty-five feet.

23. The snow thrower apparatus of claim 14, wherein the impeller comprises five or six impeller arm blades spaced about a circumference of the impeller.

24. The snow thrower apparatus of claim 14, wherein the impeller comprises an impeller arm blade that extends from near a center of rotation of the impeller at a first end to near a perimeter of the impeller at a second end, and comprises a movable portion adjacent to a face of the second end of the impeller arm blade configured to move in a direction substantially parallel to the face of the second end of the impeller arm blade from a first extent within the second end of the impeller arm blade to a second extent that is beyond the second end of the impeller arm blade and is also beyond the perimeter of the impeller.

25. A snow thrower apparatus, comprising:

a drive element supporting the snow thrower apparatus above a surface and configured to move the snow thrower apparatus with respect to the surface;

an auger housing containing an auger rotatably disposed within the auger housing;

an impeller housing adjacent the auger housing and containing an impeller rotatably disposed within the impeller housing;

a chute secured to the impeller housing and having an intake opening in fluid communication with an output of the impeller housing and a chute deflector rotatably secured to an upper portion of the chute between a lowered position and a raised position;

an electric motor and power source for providing mechanical power to the impeller, the auger, the drive element or a combination thereof;

an impeller controller configured to vary an impeller rotation speed of the impeller within a range defined by a low impeller speed at one end of the range and a high impeller speed at a second end of the range;

an impeller drive control input device movable by an operator between a low power position and a high power position and configured to cause the impeller controller to vary the impeller rotation speed between the low impeller speed and the high impeller speed; and a motor control chute deflector coupling secured to the chute deflector and responsive to the impeller drive control input device, wherein:

in response to the impeller drive control input device being moved to the low power position the motor control chute deflector coupling is configured to move the chute deflector to the lowered position, and in response to the impeller drive control input device being moved to the high power position the motor control chute deflector coupling is configured to move the chute deflector to the raised position.

26. The snow thrower apparatus of claim 25, wherein in response to the impeller drive control input device being positioned in the low power position the electric motor drives a motor output with a mechanical rotation per minute (rpm) in a range from about 1000 rpm to about 1400 rpm and in response to the impeller drive control input device being positioned in the high power position the electric motor drives the motor output with a second mechanical rpm in a second range from about 1700 rpm to about 2300 rpm.

27. The snow thrower apparatus of claim 26, wherein in response to the motor control chute deflector being in the lowered position and the motor output with the mechanical rpm in the range from about 1000 rpm to about 1400 rpm, a snow throw distance of the snow thrower apparatus is from about six to ten feet.

28. The snow thrower apparatus of claim 26, wherein in response to the motor control chute deflector being in the raised position and the motor output with the mechanical rpm in the second range from about 1700 rpm to about 2300 rpm, a snow throw distance of the snow thrower apparatus is from about nineteen to about twenty-three feet.

29. The snow thrower apparatus of claim 25, wherein power consumption of the electric motor is within a first range of about 0.5 kilowatts (kW) to about 0.7 kW with the impeller rotation speed in the low impeller speed, and power consumption of the electric motor is within a second range of about 1.0 kW to about 1.5 kW with the impeller rotation speed in the high impeller speed.

30. A snow thrower, comprising:

a drive element configured to move the snow thrower on a surface;

an auger housing and an auger positioned within the auger housing for moving material within the auger housing toward an output of the auger housing;

an impeller housing coupled to the auger housing and having an intake through which the material is received at the impeller housing from the output of the auger housing;

an impeller configured to receive the material at the intake of the impeller housing and expel the material from the impeller housing by way of a chute coupled to the impeller housing, the impeller comprising:

a blade arm extending from a first end near a center of rotation of the impeller to a second end near a perimeter of the impeller and having a blade arm length and defining a blade arm surface, and a wiper positioned adjacent to the blade arm surface and that is movable a predefined distance beyond the blade arm length of the blade arm and in a direction substantially parallel to the blade arm surface;

a power system comprising:

an electric motor that generates mechanical power as an output and receives electrical power as an input, and a distribution system configured to transfer a portion of the mechanical power to rotate the impeller within the impeller housing to facilitate expelling the material from the impeller housing by way of the chute, wherein:

the distribution system transfers a second portion of the mechanical power to rotate the auger within the auger housing, and the distribution system includes a mechanical drive exchange configured to rotate the impeller a first number, x, of rotations for each second number, n, of rotations of the auger, wherein x is selected from a range of about five to seven and n is one.

31. The snow thrower of claim 30, wherein the mechanical drive exchange comprises three or fewer gears.

\* \* \* \* \*